(12) United States Patent
Miyake et al.

(10) Patent No.: US 7,138,455 B2
(45) Date of Patent: Nov. 21, 2006

(54) ACRYLIC POLYMER POWDER, ACRYLIC SOL AND MOLDING

(75) Inventors: Katsuji Miyake, Niigata (JP); Takao Hoshiba, Niigata (JP); Toshiyuki Muramatsu, Niigata (JP)

(73) Assignee: Kuraray Co., Ltd., Kurashiki (JP)

( * ) Notice: Subject to any disclaimer, the term of this patent is extended or adjusted under 35 U.S.C. 154(b) by 298 days.

(21) Appl. No.: 10/759,200

(22) Filed: Jan. 20, 2004

(65) Prior Publication Data

US 2004/0147668 A1    Jul. 29, 2004

(30) Foreign Application Priority Data

Jan. 21, 2003 (JP) ............................ 2003-011755
May 6, 2003 (JP) ............................ 2003-127676

(51) Int. Cl.
*C08L 31/02* (2006.01)

(52) U.S. Cl. ................ 524/556; 525/902; 526/319
(58) Field of Classification Search ............. 524/556; 525/902; 526/319
See application file for complete search history.

(56) References Cited

U.S. PATENT DOCUMENTS

| | | | | |
|---|---|---|---|---|
| 4,892,932 A | * | 1/1990 | Rauch et al. ................ | 528/499 |
| 5,441,994 A | | 8/1995 | Moriga et al. | |
| 5,453,458 A | * | 9/1995 | Takeuchi et al. ............ | 523/201 |
| 5,521,252 A | * | 5/1996 | Matsuda et al. ............ | 525/255 |
| 6,503,762 B1 | * | 1/2003 | Yamauchi et al. .......... | 436/526 |
| 6,632,531 B1 | * | 10/2003 | Blankenship ............... | 428/402 |

FOREIGN PATENT DOCUMENTS

| | | |
|---|---|---|
| EP | 0 533 026 | 3/1993 |
| GB | 1 516 510 | 7/1978 |
| JP | 54-117553 | 9/1979 |
| JP | 5-279539 | 10/1993 |
| JP | 6-322225 | 11/1994 |
| JP | 7-233299 | 9/1995 |
| JP | 8-73601 | 3/1996 |
| JP | 8-295850 | 11/1996 |
| JP | 9-77950 | 3/1997 |
| JP | 3217225 | 10/2001 |
| JP | 2002-212303 | 7/2002 |

* cited by examiner

*Primary Examiner*—David W. Wu
*Assistant Examiner*—Satya Sastri
(74) *Attorney, Agent, or Firm*—Oblon, Spivak, McClelland, Maier & Neustadt, P.C.

(57) ABSTRACT

An acrylic polymer powder obtained by coagulating and drying a latex containing acrylic polymer particles, in which acrylic polymer powder, the average particle size of the powder is 5 to 10 μm, the percentage of void is 70% or less, and the integral void volume on voids having a pore diameter of 1 μm or more is 0.9 mL/g or less. Acrylic sol obtained using the powder is excellent in storage stability and fluidity.

The storage stability and fluidity of the acrylic sol can further be heightened, or it is possible to give different effects (enhancement of mixing properties of the powder with a plasticizer; lowering of the viscosity of the acrylic sol, enhancement of particle destruction resistance; enhancement of the bleed-out resistance, film uniformity and flexibility of moldings obtained from the acrylic sol, formation of smooth film; etc.), by adjusting the macropore diameter and micropore diameter of the acrylic polymer powder, the ratio between the pore volume of macropores to the pore volume of micropores per gram of the powder or the particle size ratio between the length and breadth of the powder in a specific range; incorporating a water soluble macromolecule in the latex; making a reactive surfactant a constituent of the acrylic polymer particles; or using as the latex a mixed latex of two kinds of latexes containing mutually different acrylic polymer particles.

Further, the molding of the invention never generates hydrogen chloride gas when incinerated, which is different from moldings formed from polyvinyl chloride sol.

27 Claims, No Drawings

ACRYLIC POLYMER POWDER, ACRYLIC SOL AND MOLDING

BACKGROUND OF THE INVENTION

1. Field of the Invention

This invention relates to acrylic polymer powder suitable for acrylic sol, an acrylic sol comprising the acrylic polymer powder and a plasticizer, and a molding obtained from the acrylic sol.

2. Statement of Related Art

Plastisol is matter obtained by dispersing resin powder and a filler in a plasticizer into a sol state, and the plastisol is applied by application or the like, and heated to gel into a molding. A resin industrially widely used for this process is polyvinyl chloride which is called polyvinyl chloride sol or polyvinyl chloride paste. The polyvinyl chloride sol composition is used in many fields for various purposes, namely as coating agents, impregnants, coking agents, etc. for automobiles, carpets, wallpaper, floors, etc.

On the other hand, moldings obtained from polyvinyl chloride sol compositions have the defect that, when disposed of by combustion, they strikingly damage incinerators due to the generation of hydrogen chloride gas from polyvinyl chloride. Furthermore, on recent environmental problems, polyvinyl chloride is not only a cause of acid rain but a causal substance of the destruction of the ozone layer of the earth. Thus, the appearance of plastisol free of these defects and substituting for polyvinyl chloride compositions has been desired in various commodity fields.

Under the demand, as a plastisol not generating hydrogen chloride gas at the time of combustion, acrylic sols using an acrylic resin are proposed. For example, an acrylic sol using acrylic polymer particles of a uniform composition is proposed (see GB1516510A corresponding to JP51-71344A, especially claims), but the acrylic sol has the problem that when a general purpose plasticizer such as dioctyl phthalate is used, the solubility of the particles in the plasticizer is high and the rise in viscosity of the acrylic sol occurs in several minutes after the mixing, which leads to the impossibility of film formation, and thus the acrylic sol can scarcely be used in practice. For improving the film formability and storage stability of acrylic sol, a process to copolymerize a monomer component having low compatibility with the plasticizer in an acrylic polymer is proposed (see EP533026A corresponding to JP5-279539A, especially claims), but such a sol composition has the problem that when used, the plasticizer is apt to bleed out onto the surface of the film obtained.

Plastisol compositions as acrylic sols in the state of dispersion in a plasticizer in which plastisol compositions the secondary average particle size is in the range of 0.1 to 500 µm are proposed (see GB1516510A corresponding to JP51-71344A, especially claims; JP54-117553A, especially claims). However, when an acrylic sol containing an acrylic polymer whose secondary average particle size is very small is used, the initial viscosity of the sol is high because of the large particle area per volume of the acrylic polymer particles, dilatancy is apt to occur, the fluidity of the sol is lowered, and troubles such as the uneven thickness or faintness of the film at coating, and the unevenness of spray pattern at spray coating take place. For getting such an acrylic sol containing an acrylic polymer whose secondary average particle size is very small to have a practical viscosity, there arises a necessity, e.g., to increase the amount of the plasticizer or add an organic solvent for dilution. As a result, such a problem that the plasticizer bleeds out onto the film surface, the mechanical strength of the film is lowered or the organic solvent added remains in the film and spoils the film formation is apt to occur.

On the other hand, when an acrylic sol containing an acrylic polymer whose secondary average particle size is large is used, the tendency that the viscosity is lower than that of the acrylic sol containing an acrylic polymer whose secondary average particle size is very small is seen, but there is a problem that since the uniformity of the acrylic polymer in the acrylic sol is poor and thus fish eyes are formed to prevent the formation of smooth film, and moreover, there is also a problem that since it takes a long time for the gelation of the film by heating, the productivity of products coated with the acrylic sol is apt to be lowered.

Although an acrylic sol of low viscosity containing a mixture of acrylic polymer particles having an average particle size of 0.1 to 2.0 µm with acrylic polymer particles having an average particle size of 3.0 to 50 µm is proposed (see JP 8-73601A, especially claims), there are drawbacks that a troublesome step of making a dried resin (secondary particles) into the desired particle size distributions by classification or pulverization and mixing the resulting two kinds of acrylic polymer particles is needed, and moreover the particles are destroyed by shearing force generated in the mixing with the plasticizer, etc. and thereby the stability of the sol is lowered.

As stated above, there was the problem that when a general purpose plasticizer such as dioctyl phthalate is used in acrylic sol, the solubility of the particles in the plasticizer is high and the rise in viscosity of the acrylic sol occurs in several minutes after the mixing, which leads to the impossibility of film formation, and thus the acrylic sol can scarcely be used in practice. Further, when, for improving the storage stability of an acrylic sol composition, such an acrylic sol composition that a monomer component having low compatibility with the plasticizer is copolymerized in the acrylic polymer contained therein is used, the acrylic sol composition had the problem that the plasticizer is apt to bleed out onto the surface of the film obtained. Thus, in the case of the use of acrylic polymer particles, storage stability and plasticizer retention (bleed-out resistance) after film formation are incompatible, and it was impossible to satisfy both properties in polymer particles of uniform structure.

Thus, an acrylic sol composition using particles of core shell structure is proposed in the above-mentioned EP533026A corresponding to JP5-279539A, especially claims, and an acrylic polymer wherein an acid is made to be contained in the polymer skeleton is used therein. However, the polymer proposed in the document is low in compatibility with plasticizers, and when a plasticizer low in polarity such as a phthalic ester is used, the state of plasticization gets poor and good film cannot be obtained. Further also in U.S. Pat. No. 5,441,994A corresponding to JP6-322225A, especially claims, a plastisol composition using particles of core shell structure is proposed. Although the word, particles of core shell structure, is used, the word therein means particles obtained by preparing particles of uniform structure and hydrolizing them with an alkali to convert the ester groups at the surface parts of the particles to carboxyl groups. Therefore, the thickness of the shell parts is extremely thin, and the shell parts substantially occupy only about 1% or less of the volume of the particles. Thus, the effect of the improvement of storage stability expected as a role of the shell parts is extremely low. The shell parts introduced by alkali hydrolysis has a very high acid value, and thus their compatibility with the plasticizer is extremely low and film formability is strikingly lowered. Moreover, such structural particles as above having shell parts of a high acid value are apt to take aggregative structures consisting of the particles in the plastisol, and as a result, there arises a tendency that the viscosity of the plastisol composition at low shearing rates becomes higher and workability is lowered.

Other examples of plastisol compositions using core shell structural particles are proposed in JP7-233299A, especially claims and JP8-295850A, especially claims. Therein, by using a core shell polymer consisting of a core part basically showing compatibility with plasticizers and a shell part showing incompatibility with plasticizers, very fundamental performances (storage stability of a low level, plasticizer retention of a low level, etc.) are realized. However, in order to put a plastisol composition to industrially practical use, extremely high performances [storage stability of a high level, plasticizer retention of a high level, mechanical performances (tensile strength, tensile elongation, etc.) of high levels, etc.] are required. In that point, the polymer proposed in the above documents are unsuitable for industrially practical use because the balance between a plasticizer and it in compatibility is not optimized and any of storage stability, the plasticizer retention of the film and the flexibility of the film is in a low level.

In JP8-295850A, especially claims and JP9-77950A, especially claims, an acrylic sol is proposed using acrylic polymer particles comprising component (a) consisting of a specific monomer having good compatibility with plasticizers and component (b) consisting of a specific monomer having poor compatibility with plasticizers, the constitutional ratio of component (a) being decreased in a multistage way or continuously toward the outmost layer from the center of each acrylic polymer particle, and the constitutional ratio of component (b) being increased in a multistage way or continuously toward the outmost layer from the center of each acrylic polymer particle. However, the acrylic sol using the acrylic polymer particles has a problem that since the shapes and/or properties of the acrylic polymer particles are not clearly defined therein, compatibility between the surface layer of the particles and the plasticizer is low and the diffusion of the plasticizer into the secondary particles is poor, fish eyes resulting from the remaining secondary particles are formed during film formation and smooth film cannot be formed, and therefore, there is a case where practically undesirable results occur.

Although various trials have been made for making storage stability, plasticizer retention, film flexibility, etc., which are the most fundamental properties of plastisol, stand abreast, it is the present state of things that all these plastisols are in low levels and have not reached an industrially practical level, probably partly because the shapes and/or properties of acrylic polymer particles, etc. used are not clearly defined therein.

SUMMARY OF THE INVENTION

The object of the invention lies in providing acrylic polymer powder capable of forming an acrylic sol excellent in storage stability and fluidity, an acrylic sol using the powder and having the above characteristics, and a molding obtained from the acrylic sol.

In some embodiments of the invention, another object of the invention lies in providing acrylic polymer powder having, in addition to the above characteristics, at least one of following characteristics:

(1) the acrylic polymer powder can readily be mixed with a plasticizer, etc., (2) an acrylic sol of low viscosity can be formed from the acrylic polymer powder, (3) an acrylic sol having more improved fluidity can be formed from the acrylic polymer powder, (4) an acrylic sol having more improved storage stability can be formed from the acrylic polymer powder, (5) an acrylic sol excellent in particle destruction resistance can be formed from the acrylic polymer powder, (6) a molding obtained from an acrylic sol formed from the acrylic polymer powder is excellent in plasticizer retention or bleed-out resistance, (7) a molding obtained from an acrylic sol formed from the acrylic polymer powder is excellent in the uniformity of the film; or smooth film without fish eyes can be formed from an acrylic sol formed from the acrylic polymer powder, (8) a molding obtained from an acrylic sol formed from the acrylic polymer powder is excellent in flexibility, and (9) a foamed molding obtained from an acrylic sol formed from the acrylic polymer powder is excellent in the uniformity of the foaming state.

Another object of the invention lies in providing an acrylic sol using any one of the above powders and having at least one of the above characteristics, and a molding obtained from the acrylic sol.

Still further object of the invention lies in providing such an acrylic sol that, when moldings formed therefrom are incinerated, hydrogen chloride gas is not generated, which is different from moldings formed from polyvinyl chloride sols.

The invention for solving the above problems consists of embodiment 1 as a principal embodiment, and embodiment 2, embodiment 3, embodiment 4 and embodiment 5 further improving embodiment 1.

Embodiment 1 (percentage of void) has its feature in the use of acrylic polymer powder having specific structural characteristics.

Namely, embodiment 1 relates to an acrylic polymer powder (secondary particles) obtained by coagulating and drying a latex containing acrylic polymer particles, in which acrylic polymer powder, the average particle size of the powder is 5 to 100 µm, the percentage of void is 70% or less, and the integral void volume on voids having a pore diameter of 1 µm or more is 0.9 mL/g or less.

It is preferred that the macropore diameter of the acrylic polymer powder is 7 µm or less, and the micropore diameter thereof is 0.5 µm or less.

It is also preferred that the ratio (A/B) of the pore volume A of macropores to the pore volume B of micropores per 1 g of the acrylic polymer powder is 0.5 to 5.

An acrylic sol excellent in storage stability and fluidity can be formed from the acrylic polymer powder of embodiment 1.

Embodiment 2 (particle size ratio) has its feature in that the particle size ratio of the length to breadth of the acrylic polymer powder is put in a specific range.

Namely, embodiment 2 relates to such an acrylic polymer powder that the particle size ratio a/b of the length a to breadth b of the acrylic polymer powder observed through an electron microscope is 1.0 or more but less than 2.

Such an acrylic sol that, in addition to the characteristics of embodiment 1, the acrylic sol has low viscosity and are excellent in fluidity and storage stability, and moldings obtained therefrom are excellent in plasticizer retention, can be formed from the acrylic polymer powder of embodiment 2.

Embodiment 3 (water soluble macromolecule) has its feature in that a latex containing the acrylic polymer particles and a water soluble macromolecule of specific molecular weight is used as the latex of embodiment 1 or embodiment 2.

Namely, embodiment 3 relates to the acrylic polymer powder of embodiment 1 or embodiment 2 wherein the latex is a latex containing the acrylic polymer particles and a water soluble macromolecule having a weight average molecular weight of 10,000 or more, and the use amount of the water soluble macromolecule is 0.001 to 10 parts by mass based on 100 parts by mass of the acrylic polymer particles, and the acrylic polymer powder is obtained by spray drying the latex.

Such an acrylic sol that, in addition to the characteristics of embodiment 1 or embodiment 2, the acrylic sol can readily be mixed with a plasticizer, etc., has low viscosity, and are excellent in fluidity, storage stability and particle destruction resistance, and moldings obtained therefrom are excellent in bleed-out resistance and film uniformity, can be formed from the acrylic polymer powder of embodiment 3.

In any of embodiment 1 to embodiment 3, it is preferred that the acrylic polymer particles are acrylic polymer particles (I) or acrylic polymer particles (II) which are defined below.

Acrylic Polymer Particles (I):

Acrylic polymer particles which are multistage polymer particles obtained by forming latter stage polymer (I-b) in a latex containing former stage polymer (I-a), former stage polymer (I-a) being a copolymer containing 5% by mass or more but less than 50% by mass of a methyl methacrylate unit and formed by a polymerization reaction of one stage or polymerization reactions of succeeding two stages or more using mutually different monomer compositions, latter stage polymer (I-b) being a polymer containing 50% by mass or more of a methyl methacrylate unit and formed by a polymerization reaction of one stage or polymerization reactions of succeeding two stages or more using mutually different monomer compositions, and the mass ratio of former stage polymer (I-a)/latter stage polymer (I-b) being 5/95 to 95/5.

Acrylic Polymer Particles (II):

Acrylic polymer particles which are multistage polymer particles obtained by forming latter stage polymer (II-b) in a latex containing former stage polymer (II-a), former stage polymer (II-a) being a copolymer consisting of 50 to 99.99% by mass of an alkyl acrylate ester unit, 49.99% by mass or less of a unit of another monofunctional monomer copolymerizable with the alkyl acrylate ester and 0.01 to 10% by mass of a multifunctional monomer unit and formed by a polymerization reaction of one stage or polymerization reactions of succeeding two stages or more using mutually different monomer compositions, latter stage polymer (II-b) being a polymer containing 50% by mass or more of a methyl methacrylate unit and formed by a polymerization reaction of one stage or polymerization reactions of succeeding two stages or more using mutually different monomer compositions, and the mass ratio of former stage polymer (II-a)/latter stage polymer (II-b) being 5/95 to 95/5.

Embodiment 4 (reactive surfactant) has its feature in that acrylic polymer powder obtained from acrylic polymer particles having a layer obtained by carrying out polymerization using a reactive surfactant is used.

Namely, embodiment 4 relates to the acrylic polymer powder of any of embodiment 1 to embodiment 3 wherein the acrylic polymer particles are (1) acrylic polymer particles (I) which are multistage polymer particles which are obtained by forming latter stage polymer (I-b) in a latex containing former stage polymer (I-a), and have at least one layer consisting of a copolymer having a reactive surfactant as a constituent, or (2) acrylic polymer particles (II) which are multistage polymer particles which are obtained by forming latter stage polymer (II-b) in a latex containing former stage polymer (II-a), and have at least one layer consisting of a copolymer having a reactive surfactant as a constituent.

Such an acrylic sol that, in addition to the characteristics of any of embodiment 1 to embodiment 3, the acrylic sol is excellent in storage stability, and moldings obtained therefrom are excellent inflexibility and plasticizer retention, can be formed from the acrylic polymer powder of embodiment 4. Further, when the moldings are foamed moldings, they are excellent in the uniformity of the foaming state.

Embodiment 5 (mixed latex) has its feature in that two kinds of latexes containing mutually different specific acrylic polymer particles are mixed.

Namely, embodiment 5 relates to the acrylic polymer powder of any of embodiment 1 to embodiment 3 to which the restriction is further added that the latex used is a latex obtained by mixing a latex containing the same polymer as former stage polymer (II-a) of acrylic polymer particles (II) in any of embodiment 1 to embodiment 3 (referred to as acrylic polymer particles (II-a) in embodiment 5) with a latex containing acrylic polymer particles (I-1) included in acrylic polymer particles (I) in any of embodiment 1 to embodiment 3, at a mass ratio of acrylic polymer particles (II-a)/acrylic polymer particles (I-1) of 5/95 to 40/60.

An acrylic sol that which is excellent in storage stability and can form smooth film without fish eyes can be formed from the acrylic polymer powder of embodiment 5, in addition to the characteristics of any of embodiment 1 to embodiment 3.

In any of embodiment 1 to embodiment 5, coagulation and drying is preferably spray drying.

Further, the invention relates to an acrylic sol comprising the acrylic polymer powder of any of embodiment 1 to embodiment 5 and a plasticizer.

Still further, the invention relates to a molding obtained from the acrylic sol.

DETAILED DESCRIPTION OF THE PREFERRED EMBODIMENTS

The invention is further detailedly described below, and first all of embodiment 1, namely acrylic polymer particles, acrylic polymer powder, acrylic sol and a molding are described, and then embodiment 2, embodiment 3, embodiment 4 and embodiment 5 are described, with points to be added to and/or different from embodiment 1 as the center.

1 Embodiment 1 (Percentage of Void)

First, acrylic polymer particles (primary particles) used in embodiment 1 are described.

Acrylic polymer particles used in embodiment 1 are acrylic polymer particles having at least one layer of layer structure and obtained by subjecting monomer(s) mainly chosen from acrylic esters (e.g., methyl acrylate, ethyl acrylate, butyl acrylate, 2-ethylhexyl acrylate, etc.) and/or methacrylic esters (e.g., methyl methacrylate, ethyl methacrylate, butyl methacrylate, isobutyl methacrylate, 2-ethylhexyl methacrylate, cyclohexyl methacrylate, etc.) to homopolymerization, copolymerization, graft polymerization or the like.

As acrylic polymer particles used in embodiment 1, ones containing a methyl methacrylate unit as an indispensable component, as shown in the following (1) and (2) are preferred.

(1) Acrylic polymer particles (I) which are multistage polymer particles obtained by forming latter stage polymer (I-b) in a latex containing former stage polymer (I-a), former stage polymer (I-a) being a copolymer containing 5% by mass or more but less than 50% by mass of a methyl methacrylate unit and formed by a polymerization reaction of one stage or polymerization reactions of succeeding two stages or more using mutually different monomer compositions, latter stage polymer (I-b) being a polymer containing 50% by mass or more of a methyl methacrylate unit and formed by a polymerization reaction of one stage or polymerization reactions of succeeding two stages or more using mutually different monomer compositions, and the mass ratio of former stage polymer (I-a)/latter stage polymer (I-b) being 5/95 to 95/5.

Former stage polymer (I-a) is such a copolymer that it is formed by a polymerization reaction of one stage, or formed by carrying out polymerization reaction(s) of succeeding one stage or more using mutually different monomer compositions, in a latex containing polymer particles obtained by the first polymerization reaction, and any of the copolymer(s) formed by the polymerization reaction(s) of the stage(s) (including the case of only one stage) included in the former stage consists of 5% by mass or more but less than 50% by mass of a methyl methacrylate unit and more than 50% by mass but 95% by mass or less of a unit of another monomer copolymerizable with methyl methacrylate. The proportion of the methyl methacrylate unit is preferably 20% by mass or more but less than 50% by mass, and more preferably 30% by mass or more but less than 50% by mass. When the proportion of the methyl methacrylate unit of former stage polymer (I-a) is less than 5% by mass, the strength of film formed from an acrylic sol containing acrylic polymer powder obtained by coagulating and drying the latex containing the acrylic polymer particles of the embodiment, and a plasticizer (hereinafter, sometimes merely referred to as "acrylic sol") is undesirably lowered, and when the proportion of the methyl methacrylate unit is 50% by mass or more, the bleed-out resistance and flexibility of the film surface are lowered.

Latter stage polymer (I-b) is such a (co)polymer that it is formed by a polymerization reaction of one stage, in the latex containing particles of former stage polymer (I-a), or formed by carrying out polymerization reaction(s) of succeeding two stages or more using mutually different monomer compositions, in the latex containing particles of former stage polymer (I-a), and any of the (co)polymer(s) formed by the polymerization reaction(s) of the stage(s) (including the case of only one stage) included in the latter stage consists of 50% by mass or more of a methyl methacrylate unit and 50% by mass or less of a unit of another monomer copolymerizable with methyl methacrylate. The proportion of the methyl methacrylate unit in latter stage polymer (I-b) is preferably 55 to 95% by mass, and more preferably 60 to 90% by mass. When the proportion of the methyl methacrylate unit of latter stage polymer (I-b) is less than 50% by mass, the storage stability of acrylic sol obtained is lowered.

In the above, as examples of another monomer copolymerizable with methyl methacrylate, there can be mentioned methacrylic esters excluding methyl methacrylate such as ethyl methacrylate, n-propyl methacrylate, isopropyl methacrylate, n-butyl methacrylate, isobutyl methacrylate and cyclohexyl methacrylate; acrylic esters such as methyl acrylate, ethyl acrylate, propyl acrylate, n-butyl acrylate, 2-ethylhexyl acrylate and 2-hydroxyethyl acrylate; hydroxyalkyl esters of methacrylic acid such as 2-hydroxyethyl methacrylate and hydroxypropyl methacrylate; $\alpha,\beta$-unsaturated fatty acids such as acrylic acid, methacrylic acid, crotonic acid and itaconic acid; aromatic vinyl compounds such as styrene, p-methylstyrene and o-methylstyrene; maleimide compounds such as N-propylmaleimide, N-cyclohexylmaleimide and N-o-chlorophenylmaleimide; cyanogenated vinyl compounds such as acrylonitrile and methacrylonitrile; etc. Preferred among them are methacrylic esters such as isobutyl methacrylate and cyclohexyl methacrylate, and hydroxyalkyl esters of methacrylic acid such as 2-hydroxyethyl methacrylate as being suitable for the adjustment of glass transition temperature (Tg) and the improvement of adhesion with metal. These other monomers can be used alone or in combination of two or more, and can appropriately be chosen in accordance with purposes and uses.

The weight average molecular weight (Mw) of each of former stage polymer (I-a) and latter stage polymer (I-b) as prepared alone respectively in acrylic polymer particles (I) used in embodiment 1 is appropriately chosen in accordance with uses, but is preferably in the range of 50,000 to 3,000,000 and more preferably in the range of 100,000 to 2,000,000. When the weight average molecular weight is 50,000 or more, the strength of film formed is increased, and when it is 3,000,000 or less, the rate of dissolution in plasticizers gets appropriate and productivity is increased. The adjustment of the weight average molecular weight can be made using a chain transfer agent such as mercaptans, and as the mercaptans, there can, for example, be mentioned n-octylmercaptan, n-dodecylmercaptan, n-laurylmercaptan, tert-dodecylmercaptan, etc. In accordance with uses and/or desired properties, it is also possible to copolymerize a multifunctional monomer to introduce crosslinkage structure or graft structure.

The mass ratio of former stage polymer (I-a)/latter stage polymer (I-b) in acrylic polymer particles (I) is in the range of 5/95 to 95/5, and preferably in the range of 20/80 to 80/20. When the proportion of latter stage polymer (I-b) is less than 5% by mass, the storage stability of acrylic sol obtained is lowered, and when it is more than 95% by mass, the bleed-out of the plasticizer gets apt to occur.

(2) Acrylic polymer particles (II) which are multistage polymer particles obtained by forming latter stage polymer (II-b) in a latex containing former stage polymer (II-a), former stage polymer (II-a) being a copolymer consisting of 50 to 99.99% by mass of an alkyl acrylate ester unit, 49.99% by mass or less of a unit of another monofunctional monomer copolymerizable with the alkyl acrylate ester and 0.01 to 10% by mass of a multifunctional monomer unit and formed by a polymerization reaction of one stage or polymerization reactions of succeeding two stages or more using mutually different monomer compositions, latter stage polymer (II-b) being a (co)polymer containing 50% by mass or more of a methyl methacrylate unit and formed by a polymerization reaction of one stage or polymerization reactions of succeeding two stages or more using mutually different monomer compositions, and the mass ratio of former stage polymer (II-a)/latter stage polymer (II-b) being 5/95 to 95/5.

Former stage polymer (II-a) is such a copolymer that it is formed by a polymerization reaction of one stage, or formed by carrying out polymerization reaction(s) of succeeding one stage or more using mutually different monomer compositions, in a latex containing polymer particles obtained by the first polymerization reaction, and any of the copolymers formed by the polymerization reaction(s) of the stage(s) (including the case of only one stage) included in the former stage consists of 50 to 99.99% by mass of an alkyl acrylate ester unit, 49.99% by mass or less of a unit of another monomer copolymerizable with the alkyl acrylate ester and 0.01 to 10% by mass of a multifunctional monomer. The composition of the monomer units in each of the above copolymer(s) is preferably 60 to 99.95% by mass of the alkyl acrylate ester unit, 39.95% by mass or less of the unit of another monomer copolymerizable with the alkyl acrylate ester and 0.05 to 5% by mass of the multifunctional monomer, and more preferably 70 to 99.9% by mass of the alkyl acrylate ester unit, 29.9% by mass or less of the unit of another monomer copolymerizable with the alkyl acrylate ester and 0.1 to 3% by mass of the multifunctional monomer.

When the proportion of the alkyl acrylate ester unit is less than 50% by mass, the cold resistance of film formed from acrylic sol is lowered. When the proportion of the multifunctional monomer unit is less than 0.01% by mass, the strength of film formed from acrylic sol is lowered, and when it is more than 10% by mass, the cold resistance of the film is lowered.

As to former stage polymer (II-a), as examples of the alkyl acrylate ester, there can be mentioned methyl acrylate, ethyl acrylate, propyl acrylate, n-butyl acrylate, 2-ethylhexyl acrylate, 2-hydroxyethyl acrylate, etc. can be mentioned, and among them, alkyl acrylate esters having 1 to 4 carbon atoms are preferred, and methyl acrylate, propyl acrylate and n-butyl acrylate are further preferred.

As to former stage polymer (II-a), as examples of another monomer copolymerizable with the alkyl acrylate ester, there can be mentioned methacrylic esters such as methyl methacrylate, ethyl methacrylate, n-propyl methacrylate, isopropyl methacrylate, n-butyl methacrylate, isobutyl methacrylate and cyclohexyl methacrylate; hydroxyalkyl esters of methacrylic acid such as 2-hydroxyethyl methacrylate and hydroxypropyl methacrylate; $\alpha,\beta$-unsaturated carboxylic acids such as acrylic acid, methacrylic acid, crotonic acid and itaconic acid; aromatic vinyl compounds such as styrene, p-methylstyrene and o-methylstyrene; maleimide compounds such as N-propylmaleimide, N-cyclohexylmaleimide and N-o-chlorophenylmaleimide; cyanogenated vinyl compounds such as acrylonitrile and methacrylonitrile; etc. Preferred among them are methacrylic esters such as methyl methacrylate as being suitable for the adjustment of glass transition temperature (Tg). These other monomers can be used alone or in combination of two or more, and can appropriately be chosen in accordance with purposes and uses.

As to former stage polymer (II-a), as examples of the multifunctional monomer, there can be mentioned ethylene glycol dimethacrylate, diethylene glycol dimethacrylate, triethylene glycol dimethacrylate, propylene glycol dimethacrylate, polyethylene glycol dimethacrylate, hexanediol dimethacrylate, trimethylolpropane trimethacrylate, ethylene glycol diacrylate, diethylene glycol diacrylate, triethylene glycol diacrylate, propylene glycol diacrylate, polyethylene glycol diacrylate, hexanediol diacrylate, trimethylolpropane triacrylate, divinylbenzene, diallyl phthalate, diallyl maleate, divinyl adipate, allyl acrylate, allyl methacrylate, triallyl cyanurate and triallyl isocyanurate, and among them, those having a molecular weight of 250 or more is preferred, and polyethylene glycol di(meth)acrylate wherein the constitutive polyethylene glycol has an average molecular weight of 400 to 600 are further preferred.

Latter stage polymer (II-b) is such a (co)polymer that it is formed by carrying out a polymerization reaction of one stage in the latex containing particles of former stage polymer (II-a), or formed by carrying out polymerization reaction(s) of succeeding two stages or more using mutually different monomer compositions, in the latex containing particles of former stage polymer (II-a), and any of the (co)polymers formed by the polymerization reaction(s) of the stage(s) (including the case of only one stage) included in the latter stage consists of 50% by mass or more of a methyl methacrylate unit and 50% by mass or less of a unit of another monomer copolymerizable with methyl methacrylate. The proportion of the methyl methacrylate unit in latter stage polymer (II-b) is preferably 60 to 100% by mass, and more preferably 70 to 95% by mass. When the proportion of the methyl methacrylate unit in latter stage polymer (II-b) is less than 50% by mass, the storage stability of acrylic sol obtained is lowered.

In the above, as another monomer copolymerizable with methyl methacrylate, there can be mentioned the same monomers as another monomer copolymerizable with methyl methacrylate used in the preparation of latter stage polymer (I-b).

The weight average molecular weight (Mw) of each of former stage polymer (II-a) and latter stage polymer (II-b) as prepared alone respectively in acrylic polymer particles (II) used in embodiment 1 is appropriately chosen in accordance with uses, but is preferably in the range of 50,000 to 3,000,000 and more preferably in the range of 100,000 to 2,000,000. When the weight average molecular weight is 50,000 or more, the strength of film formed is increased, and when it is 3,000,000 or less, the rate of dissolution in plasticizers gets appropriate and productivity is increased. The adjustment of the weight average molecular weight can be made using the same chain transfer agent as mentioned in acrylic polymer particles (I), and in accordance with uses and/or desired properties, it is also possible to copolymerize a multifunctional monomer to introduce crosslikage structure or graft structure.

The mass ratio of former stage polymer (II-a)/latter stage polymer (II-b) in acrylic polymer particles (II) is in the range of 5/95 to 95/5, and preferably in the range of 20/80 to 80/20. When the proportion of latter stage polymer (II-b) is less than 5% by mass, the storage stability of acrylic sol obtained is lowered, and when it is more than 95% by mass, the bleed-out of the plasticizer gets apt to occur.

The average particle size of acrylic polymer particles used in embodiment 1, preferably acrylic polymer particles (I) and/or (II) is not particularly limited, but preferably in the range of 0.05 to 30 μm, and more preferably in the range of 0.1 to 2 μm. When the average particle size is 0.05 μm or more, storage stability in a sol state is good, and when it is 30 μm or less, it is easy to obtain a uniform sol state.

In not only the case of acrylic polymer particles but the case of acrylic polymer powder, average particle sizes in the present application mean arithmetical average particle sizes.

Acrylic polymer particles used in embodiment 1, preferably acrylic polymer particles (I) and/or (II) can be prepared in a latex state, according to a known polymerization method such as an emulsion polymerization method or seed polymerization method, but it is preferred to prepare them by an emulsion polymerization method. For example, acrylic polymer particles (I) can be obtained by forming latter stage polymer (I-b) in a latex containing former stage polymer (I-a); the former stage polymer (I-a) can be formed by carrying out a polymerization reaction of one stage, or formed by carrying out polymerization reaction(s) of succeeding one stages or more using mutually different monomer compositions, in a latex containing polymer particles obtained by the first polymerization reaction; and the latter stage polymer (I-b) can be formed by carrying out a polymerization reaction of one stage in the latex containing particles of former stage polymer (I-a), or formed by carrying out polymerization reaction(s) of succeeding two stages or more using mutually different monomer compositions, in the latex containing particles of former stage polymer (I-a). Acrylic polymer particles (II) can be prepared in a similar way as in acrylic polymer particles (I).

Emulsifiers usable in the emulsion polymerization include anionic emulsifiers, nonionic emulsifiers, nonionic and anionic emulsifiers, reactive emulsifiers, etc. As anionic emulsifiers, there can, for example, be mentioned dialkyl sulfosuccinate salts such as sodium dioctyl sulfosuccinate and sodium dilaurylsulfosuccinate; alkylbenzenesulfonate salts such as sodium dodecylbenzenesulfonate; alkyl sulfate salts such as sodium dodecyl sulfate; etc. As nonionic emulsifiers, there can, for example, be mentioned polyoxyethylene alkyl ether, polyoxyethylene nonylphenyl ether, etc. As nonionic and anionic emulsifiers, there can, for example, be mentioned polyoxyethylene nonylphenyl ether sulfate salts such as sodium polyoxyethylene nonylphenyl ether sulfate; polyoxyethylene alkyl ether sulfate salts such as sodium polyoxyethylene alkyl ether sulfate; alkyl ether carboxylate salts such as sodium polyoxyethylene tridecyl ether acetate, etc. As reactive emulsifiers, there can, for example, be mentioned alkylphenoxypolyethylene glycol acrylate, acidic phosphoric acid methacrylic acid ester, alkylarylphenoxypolyethylene glycol, sodium ω-acryloyloxyalkyl(trialkyl)ammonium paratoluene-sulfonate, sodium polystyrene phenyl ether sulfate, dimethylaminoethyl-methacrylate made to be quaternary, sodium alkyl alkenyl sulfosuccinate, polyoxyethylene alkyl ether, polyoxyethylene alkylphenyl ether sulfonate, alkyl phenoxyethoxyethylsulfonate, sodium dialkyl sulfosuccinate, alkyl dipheny ether disulfonate, ammonium salt of nonylpropenylphenol ethylene oxide 10 mol adduct sulfate ester, etc. These emulsifiers can be used alone or in combination of two or more. The average repeat number of the polyethylene unit in the exemplified compounds of the above nonionic emulsifiers and nonionic and anionic emulsifiers is preferably 30 or less, more preferably 20 or less and still more preferably 10 or less for avoiding that the foaming properties of the emulsifiers get extremely large.

In the emulsion polymerization, there can be used as a polymerization initiator any of persulfate initiators such as potassium persulfate and ammonium persulfate and redox initiators such as persulfoxylate/organic peroxide and persulfate salt/sulfite salt. Further, if needed, known chain transfer agents may be used.

In the emulsion polymerization, monomers, emulsifiers, initiators, chain transfer agents, etc. can be added by any of known methods such as addition all at once, addition in portions and continuous addition, in accordance with polymerization reaction(s) of targeted stage(s).

The use amounts of the emulsifier and the polymerization initiator is not particularly limited so long as they are amounts usually used for attaining their respective purposes, but it is usually proper that the use amount of the emulsifier is on the order of 0.1 to 10% by mass and that of the polymerization initiator is on the order of 0.01 to 1% by mass, on each polymer layer.

The latex used in embodiment 1 is a latex obtained by the polymerization described above and containing the above acrylic polymer particles, preferably acrylic polymer particles (I) or acrylic polymer particles (II), or a latex obtained by mixing a latex containing acrylic polymer particle (I) with a latex containing acrylic polymer particle (II) in an optional ratio.

The latex used in embodiment 1 may also be a latex obtained by mixing plural, e.g., two or three latexes containing acrylic polymer particles having mutually different particle size distributions, respectively.

As to methods for obtaining acrylic polymer powder from a latex containing acrylic polymer particles, obtained by polymerization methods described in embodiment 1, particularly an emulsion polymerization method, there is no particular limitation, and there can be used various methods such as a spray drying method, a freeze drying method or a method wherein an acid or a salt is added to the latex to coagulate acrylic polymer particles, and then the acrylic polymer particles are dehydrated and dried. Among these methods, spray drying methods are preferred because they have an advantage that the average particle size, particle size distribution and shapes (spherical shapes are preferred) of the acrylic polymer powder are easy to arrange. While acrylic polymer powder is obtained from the latex, acrylic polymer particles partially aggregate, and therefore, the average particle size of the acrylic polymer powder usually gets larger than that of the acrylic polymer particles.

The acrylic polymer powder is mainly used for the preparing acrylic sol by mixing it with a plasticizer, and it is necessary that the average particle size of the acrylic polymer powder of embodiment 1 is 5 to 100 µm, and the average particle size is preferably in the range of 10 to 50 µm. When the average particle size is less than 5 µm, the acrylic polymer powder gets hard to handle, as is seen from the thing that they are scattered as fine particles during the preparation of acrylic sol, and when it is more than 100 µm, the powder becomes a cause of fish eyes, the appearance is spoiled and the strength of film formed is apt to be lowered (cracks are apt to be formed beginning from the fish eyes).

When the percentage of void of the acrylic polymer powder of embodiment 1 is more than 70%, the absorption of the plasticizer into the acrylic polymer powder in acrylic sol using the powder gets striking and sometimes the lowering of fluidity, dilatancy, etc. occur on the acrylic sol, which results in the lowering of moldability and processability and is undesirable. Thus, it is necessary that the percentage of void of the acrylic polymer powder of embodiment 1 is 70% or less, and it is preferred that it is 60% or less.

In embodiment 1, the percentage of void is supposed to mean the proportion of the volume of spaces among powder particles in a definite volume of acrylic polymer powder to the definite volume of the acrylic polymer powder (including the volume of spaces among particles), and can be determined by measuring the pore volume of the powder by a mercury press-in method.

The storage stability of the acrylic sol of embodiment 1 tends to be lowered in proportion as the contact area between the acrylic polymer powder and the plasticizer is increase. Therefore, as to the acrylic polymer powder of embodiment 1, integral void volume on voids each having a pore size of 1 μm or more, measured by the mercury press-in method needs to be 0.9 mL or less, and is preferably 0.8 mL or less per gram of the powder.

In embodiment 1, integral void volume is supposed to mean the total volume (mL) of pores of acrylic polymer powder.

The operational conditions of the mercury press-in method used in embodiment 1 are described in examples described later.

The above average particle size, percentage of void and integral void volume of the acrylic polymer powder of embodiment 1 can be put in the above-mentioned ranges by appropriately adjusting conditions such as the concentration of acrylic polymer particles in the latex in the course of the preparation of the above-mentioned acrylic polymers and the acquisition of acrylic polymer powder from the latex, and as the method for the preparation of the acrylic polymers, an emulsion polymerization method is particularly preferred, and as the method for the acquisition of acrylic polymer powder, a spray drying method is particularly preferred.

The acrylic polymer powder of embodiment 1 preferably has a macropore diameter of 7 μm or less and a micropore diameter of 0.5 μm or less, and more preferably has a macropore diameter of 2 to 6 μm and a micropore diameter of 0.1 to 0.4 μm. In embodiment 1, the macropore diameter is supposed to mean the pore diameter of pores having the largest volume among pores having a pore diameter of more than 1 μm, and the micropore diameter is supposed to mean the pore diameter of pores having the largest volume among pores having a pore diameter of 1 μm or less. Both of the macropore diameter and the micropore diameter can be determined by checking the powder for the relations between the pore diameter and the pore volume of the powder.

When the macropore diameter of the acrylic polymer powder is 7 μm or less and the micropore diameter thereof is 0.5 μm or less, the powder is hard to destroy at the preparation of acrylic sol, and as a result it is possible to prevent the acrylic sol from the lowering of storage stability and fluidity.

The macropore diameter and micropore diameter of the acrylic polymer powder can be put in the stated range, usually by satisfying as a latex condition $0.1<$ [solid concentration×standard deviation (μm)/the average particle size (μm) of acrylic polymer particles in the latex]

and as a condition for the spray drying of the latex $0.1<$ [(the temperature of hot air at the inlet−the temperature of hot air at the outlet)(° C.)/the average particle size (μm) of the acrylic polymer powder]$<10$.

In the above, the solid concentration is supposed to be a value determined as W2/W1 when a small portion of the latex is weighed (the mass being W1) and dried at 100° C. for 3 hours, and the matter after the drying is weighed (the mass being W2), and the standard deviation is supposed to mean the standard deviation of the average particle size of the acrylic polymer particles (primary particles).

In the acrylic polymer powder of embodiment 1, the ratio (A/B) of the pore volume A of macropores (mL) to the pore volume B of micropores (mL) per gram of the acrylic polymer powder is preferably 0.5 to 5, and more preferably 0.6 to 2. The pore volume of macropores and the pore volume of micropores can be determined by a mercury press-in method. Herein, the macropore is supposed to mean a pore having a pore diameter of more than 1 μm, and the micropore is supposed to mean a pore having a pore diameter of 1 μm or less. Further, the pore volume of macropores means the total pore volume of macropores and the pore volume of micropores means the total pore volume of micropores.

When the above ratio is 0.5 to 5, the absorption of the plasticizer in the powder is inhibited, which, as a result, leads to the inhibition of the lowering of the fluidity of the acrylic sol and the occurrence of dilatancy in the acrylic sol.

The above ratio A/B of the acrylic polymer powder can be put in the stated range, usually by satisfying as a latex condition $0.1<$ [solid concentration×standard deviation (μm)/the average particle size (μm) of acrylic polymer particles in the latex]

and as a condition for the spray drying of the latex $0.1<$ [(the temperature of hot air at the inlet−the temperature of hot air at the outlet)(° C.)/the average particle size (μm) of the acrylic polymer powder]$<10$, and further satisfying the following condition $0.1<C\times D$ (the product of both)$<5$ wherein C is the value of the above-mentioned [solid concentration×standard deviation (μm)/the average particle size (μm) of acrylic polymer particles in the latex], and D is the value of the above-mentioned [(the temperature of hot air at the inlet—the temperature of hot air at the outlet)(° C.)/the average particle size (μm) of the acrylic polymer powder].

The use of the acrylic polymer powder of embodiment 1 is not particularly limited, and can effectively be used as raw material of acrylic sol, resin reformers, powder coatings, etc., and the like. Among them, the acrylic polymer powder of embodiment 1 is particularly useful as raw material of acrylic sol.

Thus, embodiment 1 also includes an acrylic sol comprising the above acrylic polymer powder and a plasticizer.

The acrylic polymer powder used when it is mixed with a plasticizer to give an acrylic sol may be a blend of two or more of acrylic polymer powders having mutually different particle sizes.

Plasticizers usable in the acrylic sol of embodiment 1 are not particularly limited, and there can be used phthalic ester plasticizers such as dimethoxyethyl phthalate, dibutyl phthalate, dioctyl phthalate, diisononyl phthalate, diisodecyl phthalate, diundecyl phthalate, butyl benzyl phthalate, bis(methoxyethyl) phthalate, bis(ethoxyethyl) phthalate and bis(butoxyethyl) phthalate; phosphoric ester plasticizers such as diphenyl octyl phosphate, tributyl phosphate, trimethyl phosphate, tricresyl phosphate, triphenyl phosphate, trixylenyl phosphate, tris(2-ethylhexyl) phosphate, 2-ethylhexyl diphenyl phosphate, tris(isopropylphenyl) phosphate, resorcinol bis(diphenyl phosphate), bisphenol A bis(diphenyl phosphate) and bisphenol A bis(dicresyl phosphate); adipic ester plasticizers such as bis(2-ethylhexyl) adipate; sebacic ester plasticizers such as bis(2-ethylhexyl) sebacate; azelaic ester plasticizers such as bis(2-ethylhexyl) azelate; trimellitic ester plasticizers such as tris(2-ethylhexyl) trimellitate; fumaric ester plasticizers such as dibutyl fumarate; citric ester plasticizers such as tributyl acetylcitrate; oleic ester plasticizers such as butyl oleate; polyester plasticizers;

cyclohexenedicarboxylic ester plasticizers such as diisononyl 4-cyclohexene-1,2-dicarboxylate; etc.

These plasticizers can be used alone or in combination of two or more, and when it is required to give flame retardancy to moldings obtained from the acrylic sol, it is preferred to use phosphoric ester plasticizers.

The mixing ratio between the acrylic polymer powder and the plasticizer is not particularly limited, but is preferably 50 to 500 parts by mass and more preferably 50 to 200 parts by mass of the plasticizer per 100 parts of the acrylic polymer powder.

The acrylic sol of embodiment 1 can further contain fillers. As usable fillers, there can, for example, be mentioned calcium carbide, baryta, clay, colloidal silica, mica, diatom earth, kaolin, talc, bentonite, glass powder, aluminum oxide, aluminum hydroxide, antimony trioxide, titanium dioxide, carbon black, metallic soap, dye, pigment, etc. The content of the fillers is not particularly limited, but is preferably 50 to 500 parts by mass per 100 parts by mass of the acrylic polymer powder.

It is also possible to add to the acrylic sol of embodiment 1, apart from the above, a solvent such as mineral turbine as a diluent to make the acrylic sol an organosol composition. The acrylic sol of embodiment 1 can further contain various additives in accordance with their purposes. As the additives, there can, for example, be mentioned adhesion promoters, leveling agents, tack inhibitors, mold releasing agents, antifoaming agents, foaming agents, surfactants, ultraviolet absorbers, lubricants, flame retardants, light stabilizers, age resisters, antioxidants, perfumes, etc., and these can be used alone or in combination of two or more. The content of them is not particularly limited, but, generally, is preferably 0.01 to 20 parts by mass per 100 parts by mass of the acrylic polymer powder.

It is also possible to add to the acrylic sol of embodiment 1, apart from the above, a monofunctional monomer, a multifunctional monomer and an initiator, etc. to cause postcrosslinkage at the gel formation. The content of these components is not particularly limited, but, generally, is preferably 0.001 to 30 parts by mass per 100 parts by mass of the acrylic polymer powder.

The solid content in the acrylic sol of embodiment 1 is not particularly limited, but, is preferably on the order of 20 to 80% by mass based on the whole acrylic sol from the viewpoint of maintaining the viscosity of the acrylic sol in such a range that the acrylic sol is easy to handle, making the acrylic sol fit for spray drying or the like.

The acrylic sol of embodiment 1 can be obtained by mixing and/or kneading the acrylic polymer powder, a plasticizer in a liquid state, fillers in a powder state, etc. using a mixer, a kneader and/or a roll. Usually, thereafter, the acrylic sol of uniform composition prepared is defoamed according to a conventional method, and filtered through a screen or the like, or defoamed after such filtration.

As methods for obtaining moldings using the acrylic sol of embodiment 1, there can be adopted coating methods such as dip coating, knife coating, roll coating and curtain flow coating; molding methods such as dip molding, cast molding, slush molding and rotational molding; and further, various processing methods such as immersion, brushing, spraying and electostatic coating.

In order to form gel as a molding using the acrylic sol of embodiment 1, it is necessary to maintain the acrylic sol under suitable conditions of gel formation temperature and treatment time. It is preferred that the gel formation temperature is in the range of 70 to 260° C. and the treatment time is in the range of 10 seconds to 90 minutes. The acrylic sol of embodiment 1 can form uniform film under these gelation conditions. Further, depending on uses, printing, embossing processing, foaming treatment or the like can be made on the hardened film.

The acrylic sol of embodiment 1 can be used as coating, ink, adhesives, sealing agents, etc., and these can be applied to moldings such as sundries, toys, industrial parts, electrical parts and automotive parts. Further, when the acrylic sol is applied to sheet matter such as paper and cloth, wall paper, artificial leather, rugs, medical sheets, waterproof sheets, etc. can be obtained, and when the acrylic sol is applied to metal sheets, anticorrosive metal sheets can be obtained.

As to the effects of embodiment 1 described above, the acrylic polymer powder of embodiment 1 can give an acrylic sol excellent in storage stability and fluidity. Further, moldings formed from the acrylic sol never generate hydrogen chloride gas when the they are incinerated, which is different from moldings formed from polyvinyl chloride sols.

2 Embodiment 2 (Particle Size Ratio)

Embodiment 2 is described now.

Embodiment 2 is such an embodiment that, to the acrylic polymer powder of embodiment 1, a certain condition of the length and breadth of the acrylic polymer powder is added. Namely, embodiment 2 relates to the acrylic polymer powder of embodiment 1 wherein the particle size ratio a/b of the length a to breadth b of the acrylic polymer powder (secondary particles) observed through an electron microscope is 1.0 or more but less than 2; an acrylic sol comprising the acrylic polymer powder and a plasticizer; and a molding obtained from the acrylic sol.

The acrylic polymer particles (primary particles) used in embodiment 2 may be similar to the acrylic polymer particles used in embodiment 1 except that it is preferred that the glass transition temperatures (Tg) in acrylic polymer particles (I) and acrylic polymer particles (II) are 23° C. or more. When the Tg is 23° C. or more, after film formation, adhesion of the film surface, blocking, etc. do not occur or get hard to cause. The preparation of the acrylic polymer particles in embodiment 2 can be carried out in a similar way as in embodiment 1.

The latex used in embodiment 2 may be similar to the latex of embodiment 1 except for the following points.

Putting the particle size ratio a/b of the length a to breadth b of the acrylic polymer powder in embodiment 2 in the above-mentioned specific range can be attained by putting the surface tension of the latex to 500 μN/cm or less. Namely, the surface tension of the latex containing the acrylic polymer particles needs to be 500 μN/cm or less, and is preferably 450 μN/cm or less. When a latex having a surface tension of more then 500 μN/cm is spray dried, acrylic polymer powder wherein the particle size ratio a/b of the length a to breadth b falls within the specific range of embodiment 2 gets hard to obtain, and the fluidity and storage stability of acrylic sol prepared using it are apt to be lowered.

There is no particular limitation about methods for putting the surface tension of the latex containing the acrylic polymer particles to 500 μN/cm or less, and a method to add an emulsifier to the latex after the polymerization, a method to add a water soluble organic solvent into the system before the preparation of the acrylic polymer particles, a method to add such an organic solvent to the latex after the polymerization, etc. can be mentioned as preferred examples. When there is a concern about influence on the polymerization, post-addition is preferred.

In the above, as the emulsifier, emulsifiers used in the emulsion polymerization, as mentioned in embodiment 1, can be used, and the emulsifier herein may be the same as or different from that used in the emulsion polymerization. As emulsifiers for the adjustment of the surface tension of the latex to 500 µN/cm or less, there can also be used sodium alkylsulfonates, aromatic phosphoric esters, potassium salts of polyoxyethylene alkyl ether phosphate, etc. The water soluble organic solvent is not particularly limited, and there can, for example, be mentioned lower alcohols such as ethanol, methanol, n-propanol and isopropanol; water soluble ketones such as acetone; acetonitrile; dioxane; tetrahydrofuran; pyridine; etc. Among these water soluble organic solvents, ethanol and methanol are preferred in view of handle ability.

As to the acrylic polymer powder obtained in embodiment 2, in addition to the conditions in embodiment 1 such as the percentage of void, it is necessary that the particle size ratio a/b of the length a to breadth b of the acrylic polymer powder observed through an electron microscope is 1.0 or more but less than 2. This particle size ratio a/b is preferably 1.0 to 1.5. When the particle size ratio a/b is 2 or more, the specific surface area of the acrylic polymer powder (=surface area/volume) gets large, its contact area with the plasticizer is increased, and (1) the lowering of the fluidity of the acrylic sol (high viscosity) and (2) the lowering of the storage stability of the acrylic sol get apt to occur.

The uses of the acrylic polymer powder of embodiment 2 are similar to the uses in embodiment 1, the preaparation of the acrylic sol and molding of embodiment 2 can be carried out in a similar way as in embodiment 1 except for using the acrylic polymer powder of embodiment 2.

As to the effects of embodiment 2 described above, embodiment 2 gives the following effects in addition to those of embodiment 1. Namely, the acrylic polymer powder of embodiment 2 gives an acrylic sol having low viscosity and excellent in fluidity and storage stability. Further, moldings obtained from the acrylic sol never generate hydrogen chloride gas when the they are incinerated, which is different from moldings formed from polyvinyl chloride sols.

3 Embodiment 3 (Water Soluble Macromolecule)

Embodiment 3 is described now.

Embodiment 3 is such an embodiment that the condition of incorporating a water soluble macromolecule into the latex of embodiment 1 or embodiment 2 is added. Namely, embodiment 3 relates to the acrylic polymer powder of embodiment 1 or embodiment 2 wherein the latex is a latex containing the acrylic polymer particles and a water soluble macromolecule having a weight average molecular weight of 10,000 or more, and the use amount of the water soluble macromolecule is 0.001 to 10 parts by mass based on 100 parts by mass of the acrylic polymer particles, and the acrylic polymer powder is obtained by spray drying the latex; an acrylic sol comprising the acrylic polymer powder and a plasticizer; and a molding obtained from the acrylic sol.

The acrylic polymer particles used in embodiment 3 are similar to the acrylic polymer particles used in embodiment 1 except that it is preferred that the glass transition temperatures (Tg) of acrylic polymer particles (I) and acrylic polymer particles (II) are 23° C. or more. When the Tg is 23° C. or more, after film formation, adhesion of the film surface, blocking, etc. do not occur or get hard to cause.

The preparation of the acrylic polymer particles in embodiment 3 can be carried out in a similar way as in embodiment 1 or embodiment 2.

The latex used in embodiment 3 may be similar to the latex of embodiment 1 or embodiment 2 except for the following points.

In embodiment 3, a water soluble macromolecule is incorporated into a similar latex to that in embodiment 1 or embodiment 2. There is no particular limitation about the water soluble macromolecule used in embodiment 3. Specifically, there can, for example, be mentioned sodium polystyrenesulfonate, sodium polyacrylate, polyvinyl alcohol, carboxymethylcellulose, etc, and sodium polystyrenesulfonate, sodium polyacrylate and carboxymethylcellulose are preferred, and sodium polystyrenesulfonate and sodium polyacrylate are further preferred.

The weight average molecular weight of the water soluble macromolecule needs to be 10,000 or more, and is preferably 10,000 to 10,000,000 and more preferably 50,000 to 1,000,000. When the weight average molecular weight is less than 10,000, adhesion among acrylic polymer particles (primary particles) is insufficient, and the acrylic polymer powder (secondary particles) is apt to be destroyed at the preparation of the sol. There is no particular limitation about the upper limit of the weight average molecular weight, but in order to avoid the things that the latex gets viscous and hard to handle or when the water soluble macromolecule is added to the latex after the polymerization, an aggregation phenomenon occurs, it is preferred that the weight average molecular weight is 10,000,000 or less as stated above.

There is no particular limitation about methods for mixing of the latex with the water soluble macromolecule, and the water soluble macromolecule may be added into the system before the preparation of the acrylic polymers, or into the latex after the polymerization. When there is a concern about influence on the polymerization, post-addition is preferred.

The compounding amount of the water soluble macromolecule needs to be 0.001 to 10 parts by mass, and is preferably 0.005 to 2 parts by mass and more preferably 0.01 to 1 parts by mass, per 100 parts by mass of the acrylic polymer powder. When the compounding amount is less than 0.001 part by mass, adhesion among acrylic polymer particles is insufficient, and the acrylic polymer powder is sometimes destroyed at the preparation of the acrylic sol. When the compounding amount is more than 10 parts by mass, the surface smoothness of film formed tends to be lowered.

As to the acrylic polymer powder obtained in embodiment 3, in addition to the conditions such as percentage of void in embodiment 1, or such conditions in embodiment 1 and the condition of particle size ratio in embodiment 2, it is necessary to incorporate a specific amount of a water soluble macromolecule into the latex for the preparation of the acrylic polymer powder.

Other properties of the acrylic polymer powder of embodiment 3 (e.g., average particle size), uses, etc. are similar to those in embodiment 1 or embodiment 2. Further, the preparation of acrylic sol and moldings in embodiment 3 can also be made in similar manners as in embodiment 1 or embodiment 2.

As to the effects of embodiment 3 described above, embodiment 3 gives the following effects in addition to those of embodiment 1 or embodiment 2. Namely, the acrylic polymer powder of embodiment 3 gives an acrylic sol having low viscosity and excellent in fluidity, storage stability and particle destruction resistance. Further, moldings obtained from the acrylic sol are excellent in bleed-out resistance and film uniformity, and, in addition, never generate hydrogen chloride gas when the they are incinerated, which is different from moldings formed from polyvinyl chloride sols.

4 Embodiment 4 (Reactive Surfactant)

Embodiment 4 is described now.

Embodiment 4 is such an embodiment that the condition that acrylic polymer particles (I) or (II) of embodiment 1, embodiment 2 or embodiment 3 have at least one layer consisting of a copolymer having a reactive surfactant as a constituent is added to embodiment 1, embodiment 2 or embodiment 3. Namely, embodiment 4 relates to the acrylic polymer powder of embodiment 1, embodiment 2 or embodiment 3 wherein the acrylic polymer particles are multistage polymer particles which are obtained by forming latter stage polymer (I-b) in a latex containing former stage polymer (I-a) or by forming latter stage polymer (II-b) in a latex containing former stage polymer (II-a), and have at least one layer consisting of a copolymer having a reactive surfactant as a constituent; an acrylic sol comprising the acrylic polymer powder and a plasticizer; and a molding obtained from the acrylic sol.

As mentioned above, the acrylic polymer particles in embodiment 4 are, as stated above, (1) acrylic polymer particles (I) which are multistage polymer particles obtained by forming latter stage polymer (I-b) in a latex containing former stage polymer (I-a), and have at least one layer consisting of a copolymer having a reactive surfactant as a constituent, or (2) acrylic polymer particles (II) which are multistage polymer particles obtained by forming latter stage polymer (II-b) in a latex containing former stage polymer (II-a), and have at least one layer consisting of a copolymer having a reactive surfactant as a constituent.

Acrylic polymer particles (I) and/or acrylic polymer particles (II) in embodiment 4 are similar to those in embodiment 1, embodiment 2 or embodiment 3 except that a reactive surfactant unit is incorporated as a constituent. Namely, monomers constituting units other than the reactive surfactant unit and their specific examples, the mass ratio of former stage polymer (I-a)/latter stage polymer (I-b), the mass ratio of former stage polymer (II-a)/latter stage polymer (II-b), the molecular weights of acrylic polymer particles (I) and/or acrylic polymer particles (II), etc. are similar to those in embodiment 1, embodiment 2 or embodiment 3. The effects obtained by maintaining these ratios and molecular weights within the ranges or disadvantages occurring by deviating from them are also similar to those in embodiment 1, embodiment 2 or embodiment 3.

In the case of the above (1) in embodiment 4, the layer consisting of a copolymer having a reactive surfactant as a constituent may exist in former stage polymer (I-a), latter stage polymer (I-b) or both of them, but in view of heightening the storage stability of the acrylic sol, it is desirable to have the layer as at least the outermost layer of acrylic polymer particles (I), namely as at least the outermost layer of latter stage polymer (I-b).

As stated above, in embodiment 1, embodiment 2 or embodiment 3, former stage polymer (I-a) consists of 5% by mass or more but less than 50% by mass of a methyl methacrylate unit and more than 50% by mass but 95% by mass or less of the unit of another monomer copolymerizable with methyl methacrylate.

In embodiment 4, layers constituting former stage polymer (I-a) other than the layer consisting of a copolymer having a reactive surfactant as a constituent are similar to those in embodiment 1, embodiment 2 or embodiment 3. The layer consisting of a copolymer having a reactive surfactant as a constituent in former stage polymer (I-a) consists of a methyl methacrylate unit, the unit of another monomer copolymerizable with methyl methacrylate as an optional component and a reactive surfactant unit. The proportion of the methyl methacrylate unit is 5% by mass or more but less than 50% by mass, that of the unit of another monomer is more than 50% by mass but 95% by mass or less, based on the total of the methyl methacrylate unit and the unit of another monomer. The proportion of the methyl methacrylate unit is preferably 20% by mass or more but less than 50% by mass and more preferably 30% by mass or more but less than 50% by mass. The problems in the case where the proportion of the methyl methacrylate unit is less than 5% by mass, or the proportion of the methyl methacrylate unit is 50% by mass or more are similar to those in embodiment 1, embodiment 2 or embodiment 3.

As mentioned above, in embodiment 1, embodiment 2 or embodiment 3, latter stage polymer (I-b) consists of 50% by mass or more of a methyl methacrylate unit and 50% by mass or less of the unit of another monomer copolymerizable with methyl methacrylate.

In embodiment 4, layers constituting latter stage polymer (I-b) other than the layer consisting of a copolymer having a reactive surfactant as a constituent are similar to those in embodiment 1, embodiment 2 or embodiment 3. The layer consisting of a copolymer having a reactive surfactant as a constituent in latter stage polymer (I-b) consists of a methyl methacrylate unit, the unit of another monomer copolymerizable with methyl methacrylate as an optional component and a reactive surfactant unit. The proportion of the methyl methacrylate unit is 50% by mass or more and that of the unit of another monomer is 50% by mass or less, based on the total of the methyl methacrylate unit and the unit of said another monomer. The proportion of the methyl methacrylate unit is preferably 55 to 95% by mass and more preferably 60 to 90% by mass. The problems in the case where the proportion of the methyl methacrylate unit is less than 50% by mass are similar to those in embodiment 1, embodiment 2 or embodiment 3.

The content of the reactive surfactant unit is not limited in each reactive surfactant-containing layer, but is limited only in the whole of acrylic polymer particles (I). Namely, in view of making storage stability, flexibility and foaming properties better, the use amount of the reactive surfactant needs to be 0.001 to 20 parts by mass, and is preferably 0.005 to 15 parts by mass and more preferably 0.01 to 10 parts by mass, based on 100 parts by mass of the total of methyl methacrylate and said another monomer used for formation of all the layers constituting acrylic polymer particles (I).

In the case of the above (2) in embodiment 4, the layer consisting of a copolymer having a reactive surfactant as a constituent may exist in former stage polymer (II-a), latter stage polymer (II-b) or both of them, but in view of heightening the storage stability of the acrylic sol, it is desirable to have the layer as at least the outermost layer of acrylic polymer particles (II), namely as at least the outermost layer of latter stage polymer (II-b).

As stated above, in embodiment 1, embodiment 2 or embodiment 3, former stage polymer (II-a) consists of 50 to 99.99% by mass of an alkyl acrylate unit, 49.99% by mass or less of the unit of another monofunctional monomer copolymerizable with the alkyl acrylate and 0.01 to 10% by mass of a multifunctional monomer unit.

In embodiment 4, layers constituting former stage polymer (II-a) other than the layer consisting of a copolymer having a reactive surfactant as a constituent are similar to those in embodiment 1, embodiment 2 or embodiment 3. The layer consisting of a copolymer having a reactive surfactant as a constituent in former stage polymer (II-a) consists of an alkyl acrylate ester unit, the unit of said another monofunctional monomer as an optional component, a multifunctional monomer unit and a reactive surfactant unit. Based on the total of the alkyl acrylate ester unit, the unit of said another monofunctional monomer and the multifunctional monomer unit, it is necessary that the proportion of the alkyl acrylate ester unit is 50 to 99.99% by mass, the proportion of the unit of said another monofunctional monomer is 49.99% by mass or less and the proportion of the multifunctional monomer unit is 0.01 to 10% by mass, it is preferred that the proportion of the alkyl acrylate ester unit is 60 to 99.95% by mass, the proportion of the unit of said another monofunctional monomer is 39.95% by mass or less and the proportion of the multifunctional monomer unit is 0.05 to 5% by mass, and it is further preferred that the proportion of the alkyl acrylate ester unit is 70 to 99.9% by mass, the proportion of the unit of said another monofunctional monomer is 29.9% by mass or less and the proportion of the multifunctional monomer unit is 0.1 to 3% by mass. The problems in the case where the proportion of the alkyl acrylate ester unit is less than 50% by mass or in the case where the proportion of the multifunctional monomer unit is less than 0.01% by mass or more than 10% by mass are similar to those in embodiment 1, embodiment 2 or embodiment 3.

As stated above, in embodiment 1, embodiment 2 or embodiment 3, latter stage polymer (II-b) consists of 50% by mass or more of a methyl methacrylate unit and 50% by mass or less of the unit of another monomer copolymerizable with methyl methacrylate.

In embodiment 4, layers constituting latter stage polymer (II-b) other than the layer consisting of a copolymer having a reactive surfactant as a constituent are similar to those in embodiment 1, embodiment 2 or embodiment 3. The layer consisting of a copolymer having a reactive surfactant as a constituent in latter stage polymer (II-b) consists of a methyl methacrylate unit, the unit of another monomer copolymerizable with methyl methacrylate as an optional component and a reactive surfactant unit. Based on the total of the methyl methacrylate unit and the unit of said another monomer, it is necessary that the proportion of the methyl methacrylate unit is 50% by mass or more and the proportion of the unit of said another monomer is 50% by mass or less. The proportion of the methyl methacrylate unit is preferably 60 to 100% by mass and more preferably 70 to 95% by mass. The problems in the case where the proportion of the methyl methacrylate unit is less than 50% by mass are similar to those in embodiment 1, embodiment 2 or embodiment 3.

The content of the reactive surfactant unit is not limited in each reactive surfactant-containing layer, but is limited only in the whole of acrylic polymer particles (II). Namely, in view of making storage stability, flexibility and foaming properties better, the use amount of the reactive surfactant needs to be 0.001 to 20 parts by mass, and is preferably 0.005 to 15 parts by mass and more preferably 0.01 to 10 parts by mass, based on 100 parts by mass of the total of the alkyl acrylate ester, said another monofunctional monomer copolymerizable with the alkyl acrylate ester, the multifunctional monomer, methyl methacrylate and said another monomer copolymerizable with methyl methacrylate used for formation of all the layers constituting acrylic polymer particles (II).

As the reactive surfactant which is an indispensable monomer component becoming the constitutive monomer units of acrylic polymer particles (I) used in embodiment 4, any surfactants can be used so long as they can be copolymerized with at least one of methyl methacrylate and, when used, another monome copolymerizable with methyl methacrylate, and they themselves have surface activity or they have the property to give surface activity to the resin obtained by the copolymerization.

As the reactive surfactant which is an indispensable monomer component becoming the constitutive monomer units of acrylic polymer particles (II) used in embodiment 4, any surfactants can be used so long as they can be copolymerized with at least one of the alkyl acrylate ester, said another monofunctional monomer copolymerizable with the alkyl acrylate ester when used, and the multifunctional monomer in former stage polymer (II-a), and/or at least one of methyl methacrylate and, when used, another monomer copolymerizable with methyl methacrylate, and they themselves have surface activity or they have the property to give surface activity to the resin obtained by the copolymerization.

As such reactive surfactants, there can, for example, be mentioned alkylphenoxypolyethylene glycol acrylate, acidic phosphoric acid methacrylate ester, alkylarylphenoxypolyethylene glycol, sodium ω-acryloyloxyalkyl(trialkyl)ammonium para-toluenesulfonate, sodium polystyrene phenyl ether sulfate, dimethylaminoethyl methacrylate made quaternary, sodium alkyl alkenyl sulfosuccinate ester, polyoxyethylene alkyl ether, polyoxyethylene alkylpheny ether sulfonate, alkyl phenoxyethoxyethylsulfonate, sodium dialkyl sulfosuccinate, alkyl diphenyl ether disulfonate, ammonium salt of nonyl(propenyl)phenol ethylene oxide 10 mols-adduct sulfate ester, ammonium salt of nonyl(propenyl)phenol ethylene oxide 20 mols-adduct sulfate ester, ammonium salt of octyl(dipropenyl)phenol ethylene oxide 10 mols-adduct sulfate ester, ammonium salt of octyl(dipropenyl)phenol ethylene oxide 100 mols-adduct sulfate ester, sodium salt of dodecyl(propenyl)phenol ethylene oxide 20 mols-propylene oxide 10 mols-random adduct sulfate ester, sodium salt of dodecyl(propenyl)phenol butylene oxide 4 mols-ethylene oxide 30 mols-block adduct sulfate ester, nonyl(propenyl)phenol ethylene oxide 10 mols-adduct, nonyl(propenyl)phenol ethylene oxide 20 mols-adduct, octyl(dipropenyl)phenol ethylene oxide 10 mols-adduct, octyl(dipropenyl)phenol ethylene oxide 100 mols-adduct, propylene oxide 10 mols-random adduct, propylene oxide 20 mols-random adduct, ethylene oxide 30 mols-block adduct, ammonium salt of polyoxyethylene 1-(allyloxymethyl)alkyl ether sulfate ester, etc.

Preferred among them in view of heightening the storage stability of acrylic sol and the flexibility of film obtained therefrom are ammonium salt of nonyl(propenyl)phenol ethylene oxide 10 mols-adduct sulfate ester, ammonium salt of nonyl(propenyl)phenol ethylene oxide 20 mols-adduct sulfate ester, ammonium salt of octyl(dipropenyl)phenol ethylene oxide 10 mols-adduct sulfate ester, ammonium salt of octyl(dipropenyl)phenol ethylene oxide 100 mols-adduct sulfate ester, sodium salt of dodecyl(propenyl)phenol ethylene oxide 20 mols-propylene oxide 10 mols-random adduct sulfate ester, sodium salt of dodecyl(propenyl)phenol butylene oxide 4 mols-ethylene oxide 30 mols-block adduct sulfate ester, nonyl(propenyl)phenol ethylene oxide 10 mols-adduct, nonyl(propenyl)phenol ethylene oxide 20 mols-adduct, octyl(dipropenyl)phenol ethylene oxide 10 mols-adduct, octyl(dipropenyl)phenol ethylene oxide 100 mols-adduct, propylene oxide 10 mols-random adduct, propylene oxide 20 mols-random adduct, ethylene oxide 30 mols-block adduct, ammonium salt of polyoxyethylene 1-(allyloxymethyl)alkyl ether sulfate ester, etc.

The above reactive surfactants can be used alone or in combination of two or more.

Surfactants used in embodiment 4 may be reactive surfactants alone, but, in view of the adjustment of the average particle size of acrylic polymer particles obtained and the reduction of aggregate at the polymerization, other general surfactants may be used together therewith. As specific examples of such general surfactants, there can be mentioned anionic emulsifiers including salts of dialkyl sulfosuccinates such as sodium dioctyl sulfosuccinate and sodium dilauryl sulfosuccinate, salts of alkylbenzenesulfonic acids such as sodium dodecylbenezenesulfonate and salts of alkyl sulfates such as sodium dodecyl sulfate; nonionic emulsifiers such as polyoxyethylene alkyl ether and polyoxyethylene nonylphenyl ether; nonionic and anionic emulsifiers including salts of polyoxyethylene nonylphenyl ether sulfates such as sodium polyoxyethylene nonylphenyl ether sulfate, salts of polyoxyethylene alkyl ether sulfates such as sodium polyoxyethylene alkyl ether sulfate and salts of polyoxyethylene alkyl ether carboxylates such as sodium polyoxyethylene tridecyl ether acetate; etc., and these can be used alone or in combination of two or more. The average repeat number of the oxyethylene unit in the exemplified compounds of the above nonionic emulsifiers, and nonionic and anionic emulsifiers is preferably 30 or less, more preferably 20 or less and still more preferably 10 or less, for avoiding that the foaming properties of the emulsifiers gets extremely large.

When these other surfactants are used, their use amount is not particularly limited so long as the above purposes can be fulfilled, but, in the case of acrylic polymer particles (I), the use amount is, usually, preferably on the order of 0.001 to 20 parts by mass per 100 parts by mass of the total of methyl methacrylate and said another monomer copolymerizable with methyl methacrylate, and in the case of acrylic polymer particles (II), the use amount is, usually, preferably on the order of 0.001 to 20 parts by mass per 100 parts by mass of the total of the alkyl acrylate ester, said another monofunctional monomer copolymerizable with the alkyl acrylate ester, the multifunctional monomer, methyl methacrylate and said another monomer copolymerizable with methyl methacrylate.

Other properties of acrylic polymer particles (I) and acrylic polymer particles (II) of embodiment 4 (e.g., weight average molecular weight, etc.) are similar to those in embodiment 1, embodiment 2 or embodiment 3.

The preparation of acrylic polymer particles (I) and acrylic polymer particles (II) of embodiment 4 can also be carried out similarly as the preparation of acrylic polymer particles (I) and acrylic polymer particles (II) in invention 1, embodiment 2 or embodiment 3 except that a reactive surfactant, or a reactive surfactant and another general surfactant are used in place of the emulsifier.

The method for the addition of the reactive surfactant to the polymerization system may be any of a method comprising putting it in before the start of the polymerization, a method comprising dropwise adding it to the monomer (mixture), etc., but the method comprising dropwise adding it is preferred in view of polymerization stability and the storage stability of the acrylic sol.

The latex used in embodiment 4 may be similar to that in embodiment 1, embodiment 2 or embodiment 3 except that it contains acrylic polymer particles (I) or (II) of embodiment 4.

The method for obtaining acrylic polymer powder from the latex of embodiment 4 and the method for obtaining acrylic sol from the acrylic polymer powder and a plasticizer may also be similar to the corresponding methods in embodiment 1, embodiment 2 or embodiment 3.

When foamed products are made using the acrylic sol of embodiment 4, it is generally possible to obtain foamed products excellent in the uniformity of a foaming state. As methods for making foamed products using the acrylic sol, there are a method comprising mechanically mixing bubbles into the acrylic sol to form bubble sol and then gelatinizing it (mechanically foaming method), a method comprising compounding into the acrylic sol a microcapsule-type foaming agent wherein a low boiling hydrocarbon is sealed in microcapsules and then making the resulting acrylic sol gelate, a method comprising compounding into the acrylic sol a thermal decomposition-type foaming agent which generates gas at high temperature and then making the resulting acrylic sol gelate, etc., and the above effect can be attained by any of them, but the method using a thermal decomposition-type foaming agent is most preferred in the attainment of the above effect.

When a thermal decomposition-type foaming agent is used, an acrylic sol comprising the acrylic polymer powder, a plasticizer and the thermal decomposition-type foaming agent is prepared, and the acrylic sol is foamed by heating to form a formed molding (foam). As the thermal decomposition-type foaming agent, thermal decomposition-type foaming agents which have so far been known can be used without particular limits. Specifically, there can, for example, be mentioned organic thermal decomposition-type foaming agents such as azodicarbonamide, 4,4'-oxybis(benzenesulfonylhydrazide), p-toluenesulfonylhydrazide, azobisisobutyronitrile, azodiaminobenzene, azohexahydrobenzodinitrile, barium azodicarboxylate, N,N'-dinitrosopentamethylenetetramine, N,N'-dinitroso-N,N'-dimethylterephthalamide, t-butylaminonitrile and p-toluenesulfonylacetone hydrazone; inorganic thermal decomposition-type foaming agents such as sodium bicarbonate and ammonium carbonate. These can be used alone or in any combination of two or more. Among these thermal decomposition-type foaming agents, azodicarbonamide-type thermal decomposition-type foaming agents are preferred because they are easy to handle and generate a larger amount of gas.

The addition amount of the thermal decomposition-type foaming agent is varied depending on the targeted foaming magnification (specific gravity) of the foam or foam layer, uses of the form or laminate, the gas generation amount of the foaming agent, etc., but usually, is preferably 0.05 to 30 parts by mass and more preferably 0.1 to 20 parts by mass, per 100 parts by mass of the acrylic sol.

Further, in embodiment 4, in the preparation of foam using the thermal decomposition-type foaming agent, a foaming assistant may be used together in order to make foaming progress smoothly and get a foam having further uniform and finer bubbles. As the foaming assistant, foaming assistants which have so far been used for the respective thermal decomposition-type foaming agents can be used. For example, for azo-type foaming agents, sodium bicarbonate and hydrazine-type foaming agents, there can be used foaming assistants including metallic salts of carboxylic acids, metallic salts of carbonic acid such as calcium carbonate, silica, metal oxides such as alumina, minerals such as talc, etc. For example, for N,N'-dinitrosopentamethylenetetramine, there can be used foaming assistants such as urea compounds and organic acids.

Other components which can be incorporated in the acrylic sol of embodiment 4 (e.g., fillers, diluents, various additives, etc.), the solid content of the acrylic sol, etc. may be similar to those in embodiment 1, embodiment 2 or embodiment 3.

Methods for forming moldings using the acrylic sol of embodiment 4 may also be similar to those in embodiment 1, embodiment 2 or embodiment 3. Further, acrylic foam can be obtained according to a known molding method for foaming sol, using the acrylic sol of embodiment 4. For example, sheet shaped foam can be obtained by applying an acrylic sol containing a known proper foaming agent onto polyester film having suitable thickness, e.g., in a thickness of 0.5 mm, melting the applied sol by heating at a temperature of about 140° C. for the order of about 5 minutes, and then heating the sol at a temperature equal to or higher than the foaming temperature of the foaming agent for the order of about 10 minutes.

As to the effects of embodiment 4 described above, embodiment 4 gives the following effects in addition to those of embodiment 1, embodiment 2 or embodiment 3. Namely, an acrylic sol obtained by mixing the acrylic polymer powder of embodiment 4 with a plasticizer is excellent in storage stability and foaming properties. Further, moldings obtained from the acrylic sol are excellent in flexibility and plasticizer retention, and, in addition, never generate hydrogen chloride gas when they are incinerated, which is different from moldings formed from polyvinyl chloride sol.

5 Embodiment 5 (Mixed Latex)

Embodiment 5 is described now.

Embodiment 5 has its feature in that two kinds of latexes containing mutually different specific acrylic polymer particles, are mixed. Namely, embodiment 5 relates to the acrylic polymer powder of any of embodiment 1 to embodiment 3 to which the restriction is further added that the latex used is a latex obtained by mixing a latex containing the same polymer as former stage polymer (II-a) of acrylic polymer particles (II) in any of embodiment 1 to embodiment 3 (said the same polymer is referred to as acrylic polymer particles (II-a) in embodiment 5) with a latex containing acrylic polymer particles (I-1) included in acrylic polymer particles (I) in any of embodiment 1 to embodiment 3 at a mass ratio of acrylic polymer particles (II-a)/acrylic polymer particles (I-1) of 5/95 to 40/60; an acrylic sol comprising the acrylic polymer powder and a plasticizer; and a molding obtained from the acrylic sol.

More detailedly, the acrylic polymer powder of embodiment 5 is acrylic polymer powder obtained by mixing a latex containing acrylic polymer particles (II-a) with a latex containing acrylic polymer particles (I-1) at a mass ratio of acrylic polymer particles (II-a)/acrylic polymer particles (I-1) of 5/95 to 40/60, (i) acrylic polymer particles (II-a) being particles of a copolymer consisting of 50 to 99.99% by mass of an alkyl acrylate ester unit, 49.99% by mass or less of a unit of another monofunctional monomer copolymerizable with the alkyl acrylate ester and 0.01 to 10% by mass of a multifunctional monomer unit and formed by a polymerization reaction of one stage or polymerization reactions of succeeding two stages or more using mutually different monomer compositions, (ii) acrylic polymer particles (I-1) being multistage polymer particles obtained by forming latter stage polymer (I-b) in a latex containing former stage polymer (I-1-a), former stage polymer (I-1-a) being a copolymer containing 20% by mass or more but less than 50% by mass of a methyl methacrylate unit at least in the outermost layer thereof and formed by a polymerization reaction of one stage or polymerization reactions of succeeding two stages or more using mutually different monomer compositions, latter stage polymer (I-b) being a polymer containing 50% by mass or more of a methyl methacrylate unit and formed by a polymerization reaction of one stage or polymerization reactions of succeeding two stages or more using mutually different monomer compositions, and the mass ratio of former stage polymer (I-1-a)/latter stage polymer (I-b) being 5/95 to 95/5.

The proportion of a methyl methacrylate unit in layer(s) other than the outermost layer constituting former stage polymer (I-1-a) may be similar to the proportion of a methyl methacrylate unit in former stage polymer (I-a) in any of embodiment 1 to embodiment 3.

Acrylic polymer particles (II-a) in embodiment 5 are the same as former stage polymer (II-a) of acrylic polymer particles (II) in any of embodiment 1 to embodiment 3, and can be prepared in the same way as therein.

It is preferred that the glass transition temperature (Tg) of each of the polymers composing acrylic polymer particles (II-a) is 50° C. or less. When the Tg is 50° C. or less, an acrylic sol giving, after film formation, film free of the bleed-out of the plasticizer onto the film surface can be obtained.

The average particle size (primary particle size) of acrylic polymer particles (II-a) is not particularly limited, but is preferably in the range of 0.01 to 10 μm and more preferably in the range of 0.05 to 1 μm. When the average particle size is 0.01 μm or more, the handling properties of acrylic polymer particles (II-a) are heightened, and When it is 10 μm or less, the dispersibility of acrylic polymer particles (I-1) gets good and film excellent in surface smoothness can be formed.

Former stage polymer (I-1-a) in acrylic polymer particles (I-1) of embodiment 5 is different from former stage polymer (I-a) in any of embodiment 1 to embodiment 3 only in that the proportion of the methyl methacrylate unit in the outermost layer thereof is 20% by mass or more but less than 50% by mass (in former stage polymer (I-a), the proportion of the methyl methacrylate unit is 5% by mass or more but less than 50% by mass). The above latter stage polymer (I-b) is the same as latter stage polymer (I-b) in any of embodiment 1 to embodiment 3. Therefore, acrylic polymer particles (I-1) of embodiment 5 is included in acrylic polymer particles (I) in any of embodiment 1 to embodiment 3.

The proportion of the methyl methacrylate unit in the outermost layer of former stage polymer (I-1-a) needs to be 20% by mass or more but less than 50% by mass, and is preferably 30% by mass or more but less than 50% by mass and more preferably 35% by mass or more but less than 50%. When the proportion of the methyl methacrylate unit in the outermost layer of former stage polymer (I-1-a) is less than 20% by mass, the strength of film formed from an acrylic sol comprising a plasticizer and acrylic polymer powder obtained by coagulating and drying a latex containing the acrylic polymer particles of embodiment 5 is lowered, and when the proportion of the methyl methacrylate unit is 50% by mass or more, the bleed-out resistance of the film surface is lowered.

Former stage polymer (I-1-a) is composed of this methyl methacrylate unit and the unit of another monomer copolymerizable with methyl methacrylate, and said another monomer is the same as "another monomer copolymerizable with methyl methacrylate" as a constitutive unit of former stage polymer (I-a) in any of embodiment 1 to embodiment 3.

The average particle size (primary particle size) of acrylic polymer particles (I-1) is not particularly limited, but is preferably in the range of 0.15 to 30 µm and more preferably in the range of 0.15 to 2 µm. When the average particle size is in the above range, the dispersibility of acrylic polymer particles (I-1) becomes good and the surface smoothness of film formed is heightened.

The acrylic polymer powder of embodiment 5 can be obtained by mixing a latex containing acrylic polymer particles (II-a) with a latex containing acrylic polymer particles (I-1), in a latex state, and then coagulationg and drying the mixture. The acrylic polymer powder of embodiment 5 has an advantage that the mixing state can be made further uniform, compared with acrylic polymer powder obtained by mixing two kinds of acrylic polymer powders obtained from the respective latexes, and not only the dispersibility but also storage stability of acrylic sol obtained therefrom are also heightened.

The mixing ratio of the two kinds of latexes in embodiment 5 in terms of the mass ratio of acrylic polymer particles (II-a)/acrylic polymer particles (I-1) needs to be 5/95 to 40/60, and is preferably 5/95 to 35/65. When the compounding ratio of acrylic polymer particles (II-a) gets less than 5% by mass, the dispersibility of acrylic polymer particles (I-1) gets poor and the surface smoothness of film formed comes to be lowered. When the compounding ratio of acrylic polymer particles (II-a) gets more than 40% by mass, the strength of film after film formation is sometimes lowered.

Other points in embodiment 5, e.g., the preparation of acrylic polymer particles (II-a) and acrylic polymer particles (I-1), the coagulation and drying of a latex containing them, the preparation of acrylic sol, the preparation of moldings from the acrylic sol, etc. can be carried out similarly as in any of embodiment 1 to embodiment 3.

As to the effects of embodiment 5 described above, embodiment 5 gives the following effects in addition to those of embodiment 1, embodiment 2 or embodiment 3. Namely, an acrylic sol obtained by mixing the acrylic polymer powder of embodiment 5 with a plasticizer is excellent in storage stability. Further, moldings obtained from the acrylic sol are free of fish eyes and excellent in surface smoothness, and, in addition, never generate hydrogen chloride gas when they are incinerated, which is different from moldings formed from polyvinyl chloride sol.

EXAMPLES

The present invention (embodiments 1 to 5) is specifically described below according to reference examples, examples and comparative examples, but the invention is not limited thereby at all.

Measurement or evaluation of values of physical properties in the following referential examples, examples and comparative examples was made according to the following methods.

(1) Pore Volume and Pore Diameter

Pore volume and pore diameter were measured using Autopore 9420 made by Shimadzu Corporation/Micromeritics.

Measurement pressure: 0.5 to 60,000 Psi (=3.4475 kPa to 413.7 MPa) (pore diameter 320 µm to 30 angstrom)
Method: Mercury press-in method
Constants used: sample cell constant: 10.79 µL/pF, mercury contact angle: 130°,
mercury surface tension: 4.84 mN/cm, cell volume: 0.4 mL (2) Average Particle Size (on Both Primary Particles and Secondary Particles)

Average particle size was measured using laser diffraction/scattering-type particle size-measuring apparatus LA-300 made by Horiba Seisaku-sho Co., Ltd.

(3) Solid Concentration of Latex

A given mass of latex was weighed (W1), dried at 100° C. for 3 hours and then weighed after the drying (W2).
Solid concentration=W2/W1

(4) Surface Tension

The surface tension of latex was measured by the plate method (platinum plate) at 23° C. using a FACE automatic surface tension balance made by Kyowa Kaimen Kagaku Co.

(5) Particle Size Ratio

From the electron micrograph of acrylic polymer powder taken at 330-magnification using a scanning electron microscope, any 20 particles of the acrylic polymer powder not destroyed were chosen, the length a and the breadth b of each particle were measured, the ratio a/b was calculated, and their average value was assumed to be its particle size ratio.

[Evaluation Criterion of Particle Size Ratio]
◯: The particle size ratio is 1.2 or less, and sphericity is extremely high.
Δ: The particle size ratio is more than 1.2 but less than 2, and sphericity is high.
x: The particle size ratio is 2 or more, and sphericity is low.

(6) Particle Destruction Resistance

One hour after the preparation of the acrylic sol obtained in an example or comparative example, the viscosity of the acrylic sol at a revolution number of 4 rpm and a temperature of 25° C. (V1) was measured using a BH-type viscometer (made by TOKIMEC INC.) and the No. 6 rotor. Separately, the same mixture of the acrylic polymer powder with the plasticizer as that used in the preparation of the above acrylic sol was mixed at a revolution number of 100 rpm for 3 minutes using a LABO PLASTOMILL (made by Toyoseiki Seisaku-sho Co.), and defoamed using a vacuum dryer to prepare an acrylic sol, and one hour after the preparation, the viscosity of of this acrylic sol (V2) was measured. V2/V1 was calculated, and particle destruction resistance was evaluated according to the following evaluation criterion.

[Evaluation Criterion of Particle Destruction Resistance]
◯: V2/V1 is less than 2, and particle destruction resistance is extremely good.
Δ: V2/V1 is 2 or more but less than 3, and particle destruction resistance is nearly good.
x: V2/V1 is 3 or more, and particle destruction resistance is extremely poor.

(7) Fluidity

The viscosity at 25° C. of the acrylic sol obtained in an example or comparative example, at one hour after the preparation was measured at revolution numbers of 4 rpm and 10 rpm (the respective viscosities were expressed as V1 and V3) using a BH-type viscometer (made by TOKIMEC INC.) and the No. 6 or No 7 rotor. V3/V1 was calculated, and sol fluidity was evaluated according to the following evaluation criterion.

[Evaluation Criterion of Sol Fluidity]
○: V3/V1 is less than 2, and sol fluidity is extremely good.
Δ: V3/V1 is 2 or more but less than 4, and sol fluidity is nearly good.
x: V3/V1 is 4 or more, and sol fluidity is extremely poor.

(8) Storage Stability

The viscosity (initial viscosity) V1 at 25° C. of the acrylic sol obtained in an example or comparative example, at one hour after the preparation, and the viscosity V4 at 25° C. of the acrylic sol after it was allowed to stand at 40° C. for 5 days were measured at a revolution number of 4 rpm using a BH-type viscometer (made by TOKIMEC INC.) and the No. 6 rotor. V4/V1 was calculated, and storage stability was evaluated according to the following evaluation criterion.

[Evaluation Criterion of Storage Stability]
○: V4/V1 is less than 2, and storage stability is extremely good.
Δ: V4/V1 is 2 or more but less than 3, and storage stability is nearly good.
x: V4/V1 is 3 or more, and storage stability is extremely poor.

(9) Bleed-Out Resistance

A sheet of thickness 1 mm was formed at 150° C. from the acrylic sol obtained in an example or comparative example, using a compression molding machine. After the sheet was held at 25° C. for one week, the film surface was visually observed for the bleed-out state of the plasticizer, and bleed-out resistance was evaluated according to the following evaluation criterion.

[Evaluation Criterion of Bleed-Out Resistance]
○: There is no bleed-out of the plasticizer.
x: There is bleed-out of the plasticizer.

(10) Hardness

A sheet of thickness 3 mm was formed at 150° C. from the acrylic sol obtained in an example or comparative example, using a compression molding machine, and then measured for hardness according to JIS K6253 using an A-type hardness meter (made by KOBUNSHI KEIKI CO., LTD.).

(11) Tensile Strength and Tensile Elongation

A sheet of thickness 1 mm was formed at 150° C. from the acrylic sol obtained in an example or comparative example, using a compression molding machine, and then measured for tensile strength and tensile elongation according to JIS K6723 using an AUTOGRAPH AG-2000B (made by Shimadzu Corporation).

(12) Foaming Properties

The acrylic sol obtained in an example or comparative example was applied onto a polyester film of thickness 50 μm so that the thickness might be 1 mm, and heated at 140° C. for 5 minutes to prepare a sheet, and this sheet was heated at 150° C. for 10 minutes to prepare a sheet-shaped foam. This foam was visually observed for a foaming state, and evaluated for foaming properties according to the following evaluation criterion.

[Evaluation Criterion of Foaming Properties]
○: The sheet is uniformly foamed.
Δ: There are parts not uniformly foamed such as parts not foamed.
x: The sheet is broken by the foaming.

Abbreviations and their meanings on compounds used in the following referential examples, examples and comparative examples are set forth below.

MMA (methyl methacrylate), iBMA (isobutyl methacrylate), CHMA (cyclohexyl methacrylate), 2HEMA (2-hydroxyethyl methacrylate), BA (n-butyl acrylate), MAA (methacrylic acid), ALMA (allyl methacrylate), PEG9G (polyethylene glycol #400 dimethacrylate), nOM (n-octylmercaptan), KPS (potassium persulfate), HS10 (ammonium salt of nonyl(propenyl)phenol ethylene oxide 10 mols-adduct sulfate ester), KH05 (ammonium salt of polyoxyethylene 1-(allyloxymethyl)alkyl ether sulfate ester), DINP (diisononyl phthalate), RDP (resorcinol bis(diphenyl phosphate), 3NEX (sodium polyoxyethylene tridecyl ether acetate; trade name: ECT-3NEX, made by Japan Surfactant Industry Co., Ltd.), 130K (polyoxyethylene lauryl ether; trade name: EMULGEN 130K, made by Kao Co., Ltd.).

"Part(s)" used in the following referential example, examples and comparative examples mean(s) mass part(s).

Referential Example 1

Preparation of Acrylic Polymer Particles (I-1)

① 2,700 parts by mass of deionized water, 0.045 part by mass of sodium lauryl sulfate and 1.8 parts by mass of sodium carbonate were put in a reactor equipped with a stirrer, a thermometer, a nitrogen gas introduction part, a monomer introduction tube and a reflux condenser, the inside atmosphere of the reactor was sufficiently replaced with nitrogen gas so as to be substantially free of oxygen, and then the inside temperature was held at 80° C. 0.18 part by mass of KPS was added thereinto, and after 5-minutes stirring, a mixture of 90 parts by mass of a mixture consisting of 5% by mass of MMA and 95% by mass of iBMA with 0.009 part by mass of nOM was continuously added dropwise over a period of 15 minutes, and, after the completion of the addition, the polymerization reaction was continued for further 30 minutes so that the rate of polymerization could be 98% or more.

② Then, 0.63 part by mass of KPS was added into the reactor, and, after 5-minutes stirring, a mixture of 630 parts by mass of a mixture consisting of 39% by mass of MMA, 60% by mass of iBMA, 0.5% by mass of MAA and 0.5% by mass of KH05 (reactive surfactant) with 0.063 part by mass of nOM was continuously added dropwise over a period of 50 minutes, and, after the completion of the addition, the polymerization reaction was continued for further 30 minutes so that the rate of polymerization could be 98% or more.

③ Then, 0.36 part by mass of KPS was added into the reactor, and, after 5-minutes stirring, a mixture of 360 parts by mass of a mixture consisting of 58.5% by mass of MMA, 40% by mass of iBMA, 0.5% by mass of MAA and 1.0% by mass of KH05 (reactive surfactant) with 0.036 part by mass of nOM was continuously added dropwise over a period of 30 minutes, and, after the completion of the addition, the polymerization reaction was continued for further 30 minutes so that the rate of polymerization could be 98% or more.

④ Then, 0.72 part by mass of KPS was added into the reactor, and, after 5-minutes stirring, a mixture of 720 parts by mass of a mixture consisting of 64% by mass of MMA, 30% by mass of iBMA, 2.5% by mass of MAA, 2.5% by mass of 2HEMA and 1.0% by mass of KH05 (reactive surfactant) with 0.072 part by mass of nOM was continuously added dropwise over a period of 120 minutes, and, after the completion of the addition, the polymerization reaction was continued for further 60 minutes so that the rate of polymerization could be 98% or more to obtain a latex containing acrylic polymer particles (I-1). The average particle size of the acrylic polymer particles was 0.80 µm and its standard deviation was 0.21 µm, and the solid concentration of the latex was 0.40.

Referential Example 2

Preparation of Acrylic Polymer Particles (I-2)

Operations similar to those in Referential example 1 were made except that the compositions of the monomer mixtures in the first stage polymerization to the fourth stage polymerization were changed to those shown in Table 1 (Referential example 2). Thereby, a latex containing acrylic polymer particles (I-2) was obtained. The average particle size of the acrylic polymer particles was 0.81 µm and its standard deviation was 0.22 µm, and the solid concentration of the latex was 0.40.

Referential Example 3

Preparation of Acrylic Polymer Particles (I-3)

Operations similar to those in Referential example 1 were made except that the compositions of the monomer mixtures in the first stage polymerization to the fourth stage polymerization were changed to those shown in Table 1 (Referential example 3). Thereby a latex containing acrylic polymer particles (I-3) was obtained. The average particle size of the acrylic polymer particles was 0.77 µm and its standard deviation was 0.24 µm, and the solid concentration of the latex was 0.40.

Referential Example 4

Preparation of Acrylic Polymer Particles (I-4)

Operations similar to those in Referential example 1 were made except that the compositions of the monomer mixtures in the first stage polymerization to the fourth stage polymerization were changed to those shown in Table 1 (Referential example 4). Thereby a latex containing acrylic polymer particles (I-4) was obtained. The average particle size of the acrylic polymer particles was 0.77 µm and its standard deviation was 0.22 µm, and the solid concentration of the latex was 0.40.

Referential Example 5

Preparation of Acrylic Polymer Particles (I-5)

Operations similar to those in Referential example 1 were made except that the compositions of the monomer mixtures in the first stage polymerization to the fourth stage polymerization were changed to those shown in Table 1 (Referential example 5). Thereby a latex containing acrylic polymer particles (I-5) was obtained. The average particle size of the acrylic polymer particles was 0.79 µm and its standard deviation was 0.23 µm, and the solid concentration of the latex was 0.40.

Referential Example 6

Preparation of Acrylic Polymer Particles (I-6)

Operations similar to those in Referential example 1 were made except that the compositions of the monomer mixtures in the first stage polymerization to the fourth stage polymerization were changed to those shown in Table 1 (Referential example 6). Thereby a latex containing acrylic polymer particles (I-6) was obtained. The average particle size of the acrylic polymer particles was 0.79 µm and its standard deviation was 0.23 µm, and the solid concentration of the latex was 0.40.

Referential Example 7

Preparation of Acrylic Polymer Particles (II-1)

① 2,700 parts by mass of deionized water, 0.09 part by mass of sodium lauryl sulfate and 1.8 parts by mass of sodium carbonate were put in a reactor equipped with a stirrer, a thermometer, a nitrogen gas introduction part, a monomer introduction tube and a reflux condenser, the inside atmosphere of the reactor was sufficiently replaced with nitrogen gas so as to be substantially free of oxygen, and then the inside temperature was held at 80° C. 0.36 part by mass of KPS was added thereinto, and after 5-minutes stirring, 360 parts by mass of a mixture consisting of 30% by mass of MMA, 69.9% by mass of BA, 0.05% by mass of PEG9G and 0.05% by mass of ALMA was continuously added dropwise over a period of 90 minutes, and, after the completion of the addition, the polymerization reaction was continued for further 30 minutes so that the rate of polymerization could be 98% or more.

② Then, 0.72 part by mass of KPS was added into the reactor, and, after-minutes stirring, 1,440 parts by mass of a mixture consisting of 93.5% by mass of MMA, 5% by mass of iBMA, 1% by mass of MAA and 0.5% by mass of HS10 (reactive surfactant) was continuously added dropwise over a period of 180 minutes, and, after the completion of the addition, the polymerization reaction was continued for further 60 minutes so that the rate of polymerization could be 98% or more to obtain a latex containing acrylic polymer particles (II-1). The average particle size of the acrylic polymer particles was 0.67 µm and its standard deviation was 0.19 µm, and the solid concentration of the latex was 0.40.

Referential Example 8

Preparation of Acrylic Polymer Particles (II-2)

Operations similar to those in Referential example 7 were made except that the compositions and use amounts of the monomer mixtures in the first stage polymerization to the second stage polymerization were changed to those shown in Table 1 (Referential example 8); in the first stage polymerization, the use amounts of sodium lauryl sulfate and KPS were changed to 0.18 part by mass and 0.27 part by mass, respectively, and the time of the dropwise addition of the monomer mixture was changed to 70 minutes; and in the second stage polymerization, the use amount of KPS was changed to 0.77 part by mass and the time of the dropwise addition of the monomer mixture was changed to 200 minutes. Thereby, a latex containing acrylic polymer particles (II-2) was obtained. The average particle size of the acrylic polymer particles was 0.42 µm and its standard deviation was 0.16 µm, and the solid concentration of the latex was 0.40.

Referential Example 9

Preparation of Acrylic Polymer Particles (II-3)

Operations similar to those in Referential example 7 were made except that the compositions and use amounts of the monomer mixtures in the first stage polymerization to the second stage polymerization were changed to those shown in Table 1 (Referential example 9); in the first stage polymerization, the use amounts of sodium lauryl sulfate and KPS were changed to 0.27 part by mass and 0.18 part by mass, respectively, and the time of the dropwise addition of the monomer mixture was changed to 60 minutes; and in the second stage polymerization, the use amount of KPS was changed to 0.81 part by mass and the time of the dropwise addition of the monomer mixture was changed to 240 minutes. Thereby, a latex containing acrylic polymer particles (II-3) was obtained. The average particle size of the acrylic polymer particles was 0.32 μm and its standard deviation was 0.12 μm, and the solid concentration of the latex was 0.40.

Referential Example 10

Preparation of Acrylic Polymer Particles (II-4)

Operations similar to those in Referential example 7 were made except that the compositions and use amounts of the monomer mixtures in the first stage polymerization to the second stage polymerization were changed to those shown in Table 1 (Referential example 10); in the first stage polymerization, the use amounts of sodium lauryl sulfate and KPS were changed to 0.36 part by mass and 0.9 part by mass, respectively, and the time of the dropwise addition of the monomer mixture was changed to 180 minutes; and in the second stage polymerization, the use amount of KPS was changed to 0.9 part by mass and the time of the, dropwise addition of the monomer mixture was changed to 240 minutes. Thereby, a latex containing acrylic polymer particles (II-4) was obtained. The average particle size of the acrylic polymer particles was 0.20 μm and its standard deviation was 0.09 μm, and the solid concentration of the latex was 0.40.

Referential Example 11

Preparation of Acrylic Polymer Particles (II-5)

Operations similar to those in Referential example 7 were made except that the compositions of the monomer mixtures in the first stage polymerization to the second stage polymerization were changed to those shown in Table 1 (Referential example 11). Thereby, a latex containing acrylic polymer particles (II-5) was obtained. The average particle size of the acrylic polymer particles was 0.68 μm and its standard deviation was 0.18 μm, and the solid concentration of the latex was 0.40.

Referential Example 12

Preparation of Acrylic Polymer Particles (II-6)

Operations similar to those in Referential example 7 were made except that the 4 compositions of the monomer mixtures in the first stage polymerization to the second stage polymerization were changed to those shown in Table 1 (Referential example 12). Thereby, a latex containing acrylic polymer particles (II-6) was obtained. The average particle size of the acrylic polymer particles was 0.69 μL m and its standard deviation was 0.20 μm, and the solid concentration of the latex was 0.40.

Referential Example 13

Preparation of Acrylic Polymer Particles (II-7)

Operations similar to those in Referential example 7 were made except that the compositions of the monomer mixtures in the first stage polymerization to the second stage polymerization were changed to those shown in Table 1 (Referential example 13). Thereby, a latex containing acrylic polymer particles (II-7) was obtained. The average particle size of the acrylic polymer particles was 0.70 μm and its standard deviation was 0.20 μm, and the solid concentration of the latex was 0.40.

Example 1

Sodium dodecylbenzenesulfonate and sodium polyacrylate (ARON A-20ML, made by TOAGOSEI Co., Ltd., polymerization degree 500 to 1,000) were added to the latex containing acrylic polymer particles (I-1), obtained in Referential example 1 so that the amounts of the sodium dodecylbenzenesulfonate and sodium polyacrylate could be 2 parts by mass and 0.2 part by mass, respectively, based on 100 parts by mass of the acrylic polymer particles in the latex. The mixture was sufficiently stirred and it was confirmed that there was no insoluble matter. The surface tension of the latex obtained was measured. The latex was made into powder using a spray dryer (L-8 type, made by Ogawara Kakoki Co., Ltd.) under such conditions that spraying pressure was 0.15 MPa, the temperature of hot air at the inlet was 120° C., the temperature of hot air at the outlet was 67° C. and the feed amount of the latex was 2 kg/hr, and thereby acrylic polymer powder (A-1) was obtained. The observation of the powder through a scanning electron microscope revealed that polymer particles having a particle size of 1 μm or less aggregated to form powder having a particle size of 30 μm or so. Various physical properties of the powder were measured or evaluated according to the above-mentioned methods. 100 parts by mass of DINP was added to 100 parts by mass of the powder (A-1), and the mixture was mixed at a revolution number of 10 rpm for 3 minutes using a LABO PLASTOMILL (made by Toyoseiki Seisaku-sho Co.) and defoamed using a vacuum dryer to prepare an acrylic sol. Various physical properties (excluding foaming properties) of the acrylic sol and sheets obtained therefrom were measured or evaluated according to the above-mentioned methods. Separately, 100 parts by mass of DINP and 5 parts by mass of azodicarbonamide (trade name: Uniform AZ M-1, made by Otsuka Kagaku Co., Ltd.) were added to 100 parts by mass of the powder (A-1), and the mixture was mixed using a LABO PLASTOMILL (made by Toyoseiki Seisaku-sho Co.) and deaerated to prepare an acrylic sol. The foaming properties of a sheet obtained from the acrylic sol were evaluated according to the above-mentioned method.

Example 2

Operations similar to those in Example 1 were made except that sodium dodecylbenzenesulfonate as a surface tension-adjusting agent was not used and 0.2 part by mass of sodium polystyrenesulfonate (Polystyrenesulfonate PS-5, made by Toso Co., Ltd., weight average molecular weight 50,000 to 100,000) was used in place of 0.2 part by mass of sodium polyacrylate as a water soluble macromolecule. Thereby, acrylic polymer powder (A-2) was obtained. Operations similar to those in Example 1 were made except that acrylic polymer powder (A-2) was used, respectively, in place of acrylic polymer powder (A-1), to prepare 2 kinds of acrylic sols. Various physical properties were measured or evaluated in similar ways as in Example 1.

Example 3

Operations similar to those in Example 1 were made except that sodium polyacrylate as a water soluble macromolecule was not used and 1 part by mass of sodium alkylsulfonate (LATEMUL PS, made by Kao Co., Ltd.) was used in place of 2 parts by mass of sodium dodecylbenzenesulfonate as a surface tension-adjusting agent. Thereby, acrylic polymer powder (A-3) was obtained. Operations similar to those in Example 1 were made except that acrylic polymer powder (A-3) was used, respectively, in place of acrylic polymer powder (A-1), to prepare 2 kinds of acrylic sols. Various physical properties were measured or evaluated in similar ways as in Example 1.

Example 4

Operations similar to those in Example 1 were made except that the latex containing acrylic polymer particles (I-2), obtained in Referential example 2 was used in place of the latex containing acrylic polymer particles (I-1), obtained in Referential example 1, 3 parts by mass of aromatic phosphate ester (ADEKA COL CS141E, made by ASAHI DENKA KOGYO CO., LTD.) was used in place of 2 part by mass of sodium dodecylbenzenesulfonate as a surface tension-adjusting agent, 0.2 part by mass of sodium polystyrenesulfonate (Polystyrenesulfonate PS-5, made by Toso Co., Ltd., weight average molecular weight 50,000 to 100,000) was used in place of 0.2 part by mass of sodium polyacrylate as a water soluble macromolecule, the temperature of hot air at the inlet was changed from 120° C. to 100° C., and the temperature of hot air at the outlet was changed from 67° C. to 50° C. Thereby, acrylic polymer powder (A-4) was obtained. Operations similar to those in Example 1 were made except that acrylic polymer powder (A-4) was used, respectively, in place of acrylic polymer powder (A-1), to prepare 2 kinds of acrylic sols. Various physical properties were measured or evaluated in similar ways as in Example 1.

Example 5

Operations similar to those in Example 1 were made except that the latex containing acrylic polymer particles (I-3), obtained in Referential example 3 was used in place of the latex containing acrylic polymer particles (I-1), obtained in Referential example 1, 1 part by mass of potassium salt of polyoxyethylene alkyl ether phosphate (ELECK F, made by Kao Co., Ltd.) was used in place of 2 parts by mass of sodium dodecylbenzenesulfonate as a surface tension-adjusting agent, the use amount of sodium polyacrylate as a water soluble macromolecule was changed from 0.2 part by mass to 0.5 part by mass, the temperature of hot air at the inlet was changed from 120° C. to 80° C., and the temperature of hot air at the outlet was changed from 67° C. to 39° C. Thereby, acrylic polymer powder (A-5) was obtained. Operations similar to those in Example 1 were made except that acrylic polymer powder (A-5) was used, respectively, in place of acrylic polymer powder (A-1), to prepare 2 kinds of acrylic sols.

Various physical properties were measured or evaluated in similar ways as in Example 1.

Example 6

Operations similar to those in Example 1 were made except that the latex containing acrylic polymer particles (I-4), obtained in Referential example 4 was used in place of the latex containing acrylic polymer particles (I-1), obtained in Referential example 1, 1 part by mass of sodium polystyrenesulfonate (Polystyrenesulfonate PS-5, made by Toso Co., Ltd., weight average molecular weight 50,000 to 100,000) was used in place of 0.2 part by mass of sodium polyacrylate as a water soluble macromolecule, the temperature of hot air at the inlet was changed from 120° C. to 140° C., and the temperature of hot air at the outlet was changed from 67° C. to 82° C. Thereby, acrylic polymer powder (A-6) was obtained. Operations similar to those in Example 1 were made except that acrylic polymer powder (A-6) was used, respectively, in place of acrylic polymer powder (A-1), to prepare 2 kinds of acrylic sols. Various physical properties were measured or evaluated in similar ways as in Example 1.

Example 7

Aromatic phosphate ester (ADEKA COL CS141E, made by ASAHI DENKA KOGYO CO., LTD.) and sodium polyacrylate (ARON A-20ML, made by TOAGOSEI Co., Ltd., polymerization degree 500 to 1,000) were added to the latex containing acrylic polymer particles (II-1), obtained in Referential example 7 so that the amounts of the aromatic phosphate ester and the sodium polyacrylate could be 2 parts by mass and 0.2 part by mass, respectively, based on 100 parts by mass of the acrylic polymer particles in the latex. The mixture was sufficiently stirred and it was confirmed that there was no insoluble matter. The latex was made into powder using a spray dryer (L-8 type, made by Ogawara Kakoki Co., Ltd.) under such conditions that spraying pressure was 0.30 MPa, the temperature of hot air at the inlet was 140° C., the temperature of hot air at the outlet was 80° C. and the feed amount of the latex was 2.5 kg/hr, and thereby acrylic polymer powder (A-7) was obtained. The observation of the powder through a scanning electron microscope revealed that polymer particles having a particle size of 1 μm or less aggregated to form powder having a particle size of 20 μm or so. 120 parts by mass of RDP was added to 100 parts by mass of the powder (A-7), and the mixture was mixed at a revolution number of 10 rpm for 3 minutes using a LABO PLASTOMILL (made by Toyoseiki Seisaku-sho Co.) and defoamed using a vacuum dryer to prepare an acrylic sol. Separately, 120 parts by mass of RDP and 5 parts by mass of azodicarbonamide (trade name: UNIFOAM AZ M-1, made by Otsuka Kagaku Co., Ltd.) were added to 100 parts by mass of the powder (A-7), and the mixture was mixed using a LABO PLASTOMILL (made by Toyoseiki Seisaku-sho Co.) and deaerated to prepare an acrylic sol. Various physical properties were measured or evaluated in similar ways as in Example 1.

Example 8

Operations similar to those in Example 7 were made except that the aromatic phosphate ester as a surface tension-adjusting agent was not used, the temperature of hot air at the inlet was changed from 140° C. to 150° C., and the temperature of hot air at the outlet was changed from 80° C. to 85° C. Thereby, acrylic polymer powder (A-8) was obtained. Operations similar to those in Example 7 were made except that acrylic polymer powder (A-8) was used, respectively, in place of acrylic polymer powder (A-7), to prepare 2 kinds of acrylic sols. Various physical properties were measured or evaluated in similar ways as in Example 1.

Example 9

Operations similar to those in Example 7 were made except that sodium polyacrylate as a water soluble macromolecule was not used, the spraying pressure was changed from 0.30 MPa to 0.20 MPa, the temperature of hot air at the inlet was changed from 140° C. to 120° C., the temperature of hot air at the outlet was changed from 80° C. to 72° C., and the feed amount of the latex was changed from 2.5 kg/hr to 2.0 kg/hr. Thereby, acrylic polymer powder (A-9) was obtained. Operations similar to those in Example 7 were made except that acrylic polymer powder (A-9) was used, respectively, in place of acrylic polymer powder (A-7), to prepare 2 kinds of acrylic sols. Various physical properties were measured or evaluated in similar ways as in Example 1.

Example 10

The latex containing acrylic polymer particles (II-1), obtained in Referential example 7, the latex containing acrylic polymer particles (II-2), obtained in Referential example 8, and the latex containing acrylic polymer particles (II-3), obtained in Referential example 9 were mixed in a ratio by mass of 6:2:2. The solid concentration of the mixed latex was 0.4, the average particle size of the acrylic polymer particles contained therein was 0.62 μm and its standard deviation was 0.21 μm. Operations similar to those in Example 7 were made except that this mixed latex was used in place of the latex of Example 7, the spraying pressure was changed from 0.30 MPa to 0.20 MPa, the temperature of hot air at the inlet was changed from 140° C. to 120° C., the temperature of hot air at the outlet was changed from 80° C. to 72° C., and the feed amount of the latex was changed from 2.5 kg/hr to 2.0 kg/hr. Thereby, acrylic polymer powder (A-10) was obtained. Operations similar to those in Example 7 were made except that acrylic polymer powder (A-10) was used, respectively, in place of acrylic polymer powder (A-7), to prepare 2 kinds of acrylic sols. Various physical properties were measured or evaluated in similar ways as in Example 1.

Example 11

The latex containing acrylic polymer particles (I-1), obtained in Referential example 1, and the latex containing acrylic polymer particles (II-4), obtained in Referential example 10 were mixed in a ratio by mass of 7:3. The solid concentration of the mixed latex was 0.4, the average particle size of the acrylic polymer particles contained therein was 0.66 μm and its standard deviation was 0.28 μm. Operations similar to those in Example 7 were made except that this mixed latex was used in place of the latex of Example 7, 2 parts by mass of potassium salt of polyoxyethylene alkyl ether phosphate (ELEC F, made by Kao Co., Ltd.) was used in place of 2 part by mass of aromatic phosphate ester as a surface tension-adjusting agent, 0.2 part by mass of sodium polystyrenesulfonate (Polystyrenesulfonate PS-5, made by Toso Co., Ltd., weight average molecular weight 50,000 to 100,000) was used in place of 0.2 part by mass of sodium polyacrylate as a water soluble macromolecule, the spraying pressure was changed from 0.30 MPa to 0.15 MPa, the temperature of hot air at the inlet was changed from 140° C. to 100° C., the temperature of hot air at the outlet was changed from 80° C. to 55° C., and the feed amount of the latex was changed from 2.5 kg/hr to 2.0 kg/hr. Thereby, acrylic polymer powder (A-11) was obtained. Operations similar to those in Example 7 were made except that acrylic polymer powder (A-11) was used, respectively, in place of acrylic polymer powder (A-7), and 100 parts by mass of DINP was used, respectively, in place of 120 parts by mass of RDP as a plasticizer, to prepare 2 kinds of acrylic sols. Various physical properties were measured or evaluated in similar ways as in Example 1.

Example 12

Operations similar to those in Example 7 were made except that the latex containing acrylic polymer particles (II-5), obtained in Referential example 11 was used in place of the latex containing acrylic polymer particles (II-1), obtained in Referential example 7, 2 parts by mass of sodium alkylsulfonate (LATEMUL PS, made by Kao Co., Ltd.) was used in place of 2 part by mass of the aromatic phosphate ester as a surface tension-adjusting agent, 0.2 part by mass of sodium polystyrenesulfonate (Polystyrenesulfonate PS-5, made by Toso Co., Ltd., weight average molecular weight 50,000 to 100,000) was used in place of 0.2 part by mass of sodium polyacrylate as a water soluble macromolecule, the spraying pressure was changed from 0.30 MPa to 0.25 MPa, the temperature of hot air at the outlet was changed from 80° C. to 85° C., and the feed amount of the latex was changed from 2.5 kg/hr to 2.0 kg/hr. Thereby, acrylic polymer powder (A-12) was obtained. Operations similar to those in Example 7 were made except that acrylic polymer powder (A-12) was used, respectively, in place of acrylic polymer powder (A-7) to prepare 2 kinds of acrylic sols. Various physical properties were measured or evaluated in similar ways as in Example 1.

Example 13

Operations similar to those in Example 7 were made except that the latex containing acrylic polymer particles (II-6), obtained in Referential example 12 was used in place of the latex containing acrylic polymer particles (II-1), obtained in Referential example 7, the spraying pressure was changed from 0.30 MPa to 0.25 MPa, the temperature of hot air at the outlet was changed from 80° C. to 85° C., and the feed amount of the latex was changed from 2.5 kg/hr to 2.0 kg/hr. Thereby, acrylic polymer powder (A-13) was obtained. Operations similar to those in Example 7 were made except that acrylic polymer powder (A-13) was used, respectively, in place of acrylic polymer powder (A-7) to prepare 2 kinds of acrylic sols. Various physical properties were measured or evaluated in similar ways as in Example 1.

Example 14

Operations similar to those in Example 1 were made except that the latex containing acrylic polymer particles (I-5), obtained in Referential example 5 was used in place of the latex containing acrylic polymer particles (I-1), obtained in Referential example 1, sodium dodecylbenzenesulfonate as a surface tension-adjusting agent and sodium polyacrylate as a water soluble macromolecule were not used, the temperature of hot air at the inlet was changed from 120° C. to 100° C., and the temperature of hot air at the outlet was changed from 67° C. to 50° C. Thereby, acrylic polymer powder (A-14) was obtained. Operations similar to those in Example 1 were made except that acrylic polymer powder (A-14) was used, respectively, in place of acrylic polymer powder (A-1) to prepare 2 kinds of acrylic sols. Various physical properties were measured or evaluated in similar ways as in Example 1.

Example 15

Operations similar to those in Example 1 were made except that the latex containing acrylic polymer particles (I-5), obtained in Referential example 5 was used in place of the latex containing acrylic polymer particles (I-1), obtained in Referential example 1, sodium polyacrylate as a water soluble macromolecule was not used, the temperature of hot air at the inlet was changed from 120° C. to 100° C., and the temperature of hot air at the outlet was changed from 67° C. to 50° C. Thereby, acrylic polymer powder (A-15) was obtained. Operations similar to those in Example 1 were made except that acrylic polymer powder (A-15) was used, respectively, in place of acrylic polymer powder (A-1) to prepare 2 kinds of acrylic sols. Various physical properties were measured or evaluated in similar ways as in Example 1.

Example 16

Operations similar to those in Example 1 were made except that the latex containing acrylic polymer particles (I-5), obtained in Referential example 5 was used in place of the latex containing acrylic polymer particles (I-1), obtained in Referential example 1, sodium dodecylbenzenesulfonate as a surface tension-adjusting agent was not used, the temperature of hot air at the inlet was changed from 120° C. to 100° C., and the temperature of hot air at the outlet was changed from 67° C. to 50° C. Thereby, acrylic polymer powder (A-16) was obtained. Operations similar to those in Example 1 were made except that acrylic polymer powder (A-16) was used, respectively, in place of acrylic polymer powder (A-1) to prepare 2 kinds of acrylic sols. Various physical properties were measured or evaluated in similar ways as in Example 1.

Example 17

Operations similar to those in Example 1 were made except that the latex containing acrylic polymer particles (I-3), obtained in Referential example 3 was used in place of the latex containing acrylic polymer particles (I-1), obtained in Referential example 1, sodium dodecylbenzenesulfonate as a surface tension-adjusting agent and sodium polyacrylate as a water soluble macromolecule were not used, the temperature of hot air at the inlet was changed from 120° C. to 80° C., and the temperature of hot air at the outlet was changed from 67° C. to 40° C. Thereby, acrylic polymer powder (A-17) was obtained. Operations similar to those in Example 1 were made except that acrylic polymer powder (A-17) was used, respectively, in place of acrylic polymer powder (A-1) to prepare 2 kinds of acrylic sols. Various physical properties were measured or evaluated in similar ways as in Example 1.

Example 18

Operations similar to those in Example 1 were made except that the latex containing acrylic polymer particles (I-2), obtained in Referential example 2 was used in place of the latex containing acrylic polymer particles (I-1), obtained in Referential example 1, sodium dodecylbenzenesulfonate as a surface tension-adjusting agent and sodium polyacrylate as a water soluble macromolecule were not used, the temperature of hot air at the inlet was changed from 120° C. to 100° C., and the temperature of hot air at the outlet was changed from 67° C. to 50° C. Thereby, acrylic polymer powder (A-18) was obtained. Operations similar to those in Example 1 were made except that acrylic polymer powder (A-18) was used, respectively, in place of acrylic polymer powder (A-1) to prepare 2 kinds of acrylic sols. Various physical properties were measured or evaluated in similar ways as in Example 1.

Example 19

Operations similar to those in Example 1 were made except that the latex containing acrylic polymer particles (I-6), obtained in Referential example 6 was used in place of the latex containing acrylic polymer particles (I-1), obtained in Referential example 1, sodium dodecylbenzenesulfonate as a surface tension-adjusting agent and sodium polyacrylate as a water soluble macromolecule were not used, the temperature of hot air at the inlet was changed from 120° C. to 100° C., and the temperature of hot air at the outlet was changed from 67° C. to 50° C. Thereby, acrylic polymer powder (A-19) was obtained. Operations similar to those in Example 1 were made except that acrylic polymer powder (A-19) was used, respectively, in place of acrylic polymer powder (A-1) to prepare 2 kinds of acrylic sols. Various physical properties were measured or evaluated in similar ways as in Example 1.

Example 20

Operations similar to those in Example 7 were made except that the latex containing acrylic polymer particles (II-7), obtained in Referential example 13 was used in place of the latex containing acrylic polymer particles (II-1), obtained in Referential example 7, and the aromatic phosphate ester as a surface tension-adjusting agent and sodium polyacrylate as a water soluble macromolecule were not used. Thereby, acrylic polymer powder (A-20) was obtained. Operations similar to those in Example 7 were made except that acrylic polymer powder (A-20) was used, respectively, in place of acrylic polymer powder (A-7) to prepare 2 kinds of acrylic sols. Various physical properties were measured or evaluated in similar ways as in Example 1.

Example 21

Operations similar to those in Example 7 were made except that the latex containing acrylic polymer particles (II-7), obtained in Referential example 13 was used in place of the latex containing acrylic polymer particles (II-1), obtained in Referential example 7, and sodium polyacrylate as a water soluble macromolecule was not used. Thereby, acrylic polymer powder (A-21) was obtained. Operations similar to those in Example 7 were made except that acrylic polymer powder (A-21) was used, respectively, in place of acrylic polymer powder (A-7) to prepare 2 kinds of acrylic sols. Various physical properties were measured or evaluated in similar ways as in Example 1.

Example 22

Operations similar to those in Example 7 were made except that the latex containing acrylic polymer particles (II-7), obtained in Referential example 13 was used in place of the latex containing acrylic polymer particles (II-1), obtained in Referential example 7, the aromatic phosphate ester as a surface tension-adjusting agent was not used, and 0.2 part by mass of sodium polystyrenesulfonate (Polystyrenesulfonate PS-5, made by Toso Co., Ltd., weight average molecular weight 50,000 to 100,000) was used in place of 0.2 part by mass of sodium polyacrylate as a water soluble macromolecule. Thereby, acrylic polymer powder (A-22) was obtained. Operations similar to those in Example 7 were made except that acrylic polymer powder (A-22) was used, respectively, in place of acrylic polymer powder (A-7) to prepare 2 kinds of acrylic sols. Various physical properties were measured or evaluated in similar ways as in Example 1.

Example 23

Operations similar to those in Example 7 were made except that the latex containing acrylic polymer particles (II-6), obtained in Referential example 12 was used in place of the latex containing acrylic polymer particles (II-1), obtained in Referential example 7, the aromatic phosphate ester as a surface tension-adjusting agent and sodium polyacrylate as a water soluble macromolecule were not used, the spraying pressure was changed from 0.30 MPa to 0.25 MPa, the temperature of hot air at the outlet was changed from 80° C. to 85° C., and the feed amount of the latex was changed from 2.5 kg/hr to 2.0 kg/hr. Thereby, acrylic polymer powder (A-23) was obtained. Operations similar to those in Example 7 were made except that acrylic polymer powder (A-23) was used, respectively, in place of acrylic polymer powder (A-7) to prepare 2 kinds of acrylic sols. Various physical properties were measured or evaluated in similar ways as in Example 1.

Example 24

Operations similar to those in Example 7 were made except that the latex containing acrylic polymer particles (II-5), obtained in Referential example 11 was used in place of the latex containing acrylic polymer particles (II-1), obtained in Referential example 7, and the aromatic phosphate ester as a surface tension-adjusting agent and sodium polyacrylate as a water soluble macromolecule were not used. Thereby, acrylic polymer powder (A-24) was obtained. Operations similar to those in Example 7 were made except that acrylic polymer powder (A-24) was used, respectively, in place of acrylic polymer powder (A-7) to prepare 2 kinds of acrylic sols. Various physical properties were measured or evaluated in similar ways as in Example 1.

Comparative Example 1

100 parts by mass of deionized water was mixed with 100 parts by mass of the latex containing acrylic polymer particles (I-1), obtained in Referential example 1. The solid concentration of this latex was 0.20. Operations similar to those in Example 1 were made except that this latex was used in place of the latex of Example 1, the spraying pressure was changed from 0.15 MPa to 0.10 MPa, the temperature of hot air at the inlet was changed from 120° C. to 180° C., the temperature of hot air at the outlet was changed from 67° C. to 82° C., and the feed amount of the latex was changed from 2 kg/hr to 1 kg/hr. Thereby, acrylic polymer powder (A-25) was obtained. The observation of the powder through a scanning electron microscope revealed that polymer particles having a particle size of 1 μm or less aggregated to form powder having a particle size of 10 μm or so. Operations similar to those in Example 1 were made except that acrylic polymer powder (A-25) was used, respectively, in place of acrylic polymer powder (A-1) to prepare 2 kinds of acrylic sols. Various physical properties were measured or evaluated in similar ways as in Example 1.

Comparative Example 2

100 parts by mass of deionized water was mixed with 100 parts by mass of the latex containing acrylic polymer particles (I-1), obtained in Referential example 1. The solid concentration of this latex was 0.20. Operations similar to those in Example 2 were made except that this latex was used in place of the latex of Example 2, the spraying pressure was changed from 0.15 MPa to 0.10 MPa, the temperature of hot air at the inlet was changed from 120° C. to 180° C., the temperature of hot air at the outlet was changed from 67° C. to 82° C., and the feed amount of the latex was changed from 2 kg/hr to 1 kg/hr. Thereby, acrylic polymer powder (A-26) was obtained. The observation of the powder through a scanning electron microscope revealed that polymer particles having a particle size of 1 μm or less aggregated to form powder having a particle size of 15 μm or so. Operations similar to those in Example 2 were made except that acrylic polymer powder (A-26) was used, respectively, in place of acrylic polymer powder (A-2) to prepare 2 kinds of acrylic sols. Various physical properties were measured or evaluated in similar ways as in Example 1.

Comparative Example 3

100 parts by mass of deionized water was mixed with 100 parts by mass of the latex containing acrylic polymer particles (I-1), obtained in Referential example 1. The solid concentration of this latex was 0.20. Operations similar to those in Example 3 were made except that this latex was used in place of the latex of Example 3, the spraying pressure was changed from 0.15 MPa to 0.10 MPa, the temperature of hot air at the inlet was changed from 120° C. to 180° C., the temperature of hot air at the outlet was changed from 67° C. to 82 CC, and the feed amount of the latex was changed from 2 kg/hr to 1 kg/hr. Thereby, acrylic polymer powder (A-27) was obtained. The observation of the powder through a scanning electron microscope revealed that polymer particles having a particle size of 1 μm or less aggregated to form powder having a particle size of 10 μm or so. Operations similar to those in Example 3 were made except that acrylic polymer powder (A-27) was used, respectively, in place of acrylic polymer powder (A-3) to prepare 2 kinds of acrylic sols. Various physical properties were measured or evaluated in similar ways as in Example 1.

Comparative Example 4

Operations similar to those in Example 4 were made except that the spraying pressure was changed from 0.15 MPa to 0.5 MPa, the temperature of hot air at the inlet was changed from 100° C. to 140° C., the temperature of hot air at the outlet was changed from 50° C. to 67° C., and the feed amount of the latex was changed from 2 kg/hr to 3 kg/hr. Thereby, acrylic polymer powder (A-28) was obtained. Operations similar to those in Example 4 were made except that acrylic polymer powder (A-28) was used, respectively, in place of acrylic polymer powder (A-4) to prepare 2 kinds of acrylic sols. Various physical properties were measured or evaluated in similar ways as in Example 1.

Comparative Example 5

Operations similar to those in Example 5 were made except that the spraying pressure was changed from 0.15 MPa to 0.5 MPa, the temperature of hot air at the inlet was changed from 80° C. to 140° C., the temperature of hot air at the outlet was changed from 39° C. to 67° C., and the feed amount of the latex was changed from 2 kg/hr to 3 kg/hr. Thereby, acrylic polymer powder (A-29) was obtained. Operations similar to those in Example 5 were made except that acrylic polymer powder (A-29) was used, respectively, in place of acrylic polymer powder (A-5) to prepare 2 kinds of acrylic sols. Various physical properties were measured or evaluated in similar ways as in Example 1.

Comparative Example 6

Operations similar to those in Example 6 were made except that the spraying pressure was changed from 0.15 MPa to 0.5 MPa, the temperature of hot air at the outlet was changed from 82° C. to 67° C., and the feed amount of the latex was changed from 2 kg/hr to 3 kg/hr. Thereby, acrylic polymer powder (A-30) was obtained.

Operations similar to those in Example 6 were made except that acrylic polymer powder (A-30) was used, respectively, in place of acrylic polymer powder (A-6) to prepare 2 kinds of acrylic sols. Various physical properties were measured or evaluated in similar ways as in Example 1.

Comparative Example 7

100 parts by mass of deionized water was mixed with 100 parts by mass of the latex containing acrylic polymer particles (II-1), obtained in Referential example 7. The solid concentration of this latex was 0.20. Operations similar to those in Example 7 were made except that this latex was used in place of the latex of Example 7, the spraying pressure was changed from 0.30 MPa to 0.50 MPa, the temperature of hot air at the inlet was changed from 140° C. to 200° C., the temperature of hot air at the outlet was changed from 80° C. to 74° C. and the feed amount of the latex was changed from 2.5 kg/hr to 1.5 kg/hr. Thereby, acrylic polymer powder (A-31) was obtained. Operations similar to those in Example 7 were made except that acrylic polymer powder (A-31) was used, respectively, in place of acrylic polymer powder (A-7) to prepare 2 kinds of acrylic sols. Various physical properties were measured or evaluated in similar ways as in Example 1.

Comparative Example 8

100 parts by mass of deionized water was mixed with 100 parts by mass of the latex containing acrylic polymer particles (II-1), obtained in Referential example 7. The solid concentration of this latex was 0.20. Operations similar to those in Example 8 were made except that this latex was used in place of the latex of Example 8, the spraying pressure was changed from 0.30 MPa to 0.05 MPa, the temperature of hot air at the inlet was changed from 150° C. to 180° C., the temperature of hot air at the outlet was changed from 85° C. to 130° C. and the feed amount of the latex was changed from 2.5 kg/hr to 2.0 kg/hr. Thereby, acrylic polymer powder (A-32) was obtained. Operations similar to those in Example 8 were made except that acrylic polymer powder (A-32) was used, respectively, in place of acrylic polymer powder (A-8) to prepare 2 kinds of acrylic sols. Various physical properties were measured or evaluated in similar ways as in Example 1.

Comparative Example 9

100 parts by mass of deionized water was mixed with 100 parts by mass of the latex containing acrylic polymer particles (II-1), obtained in Referential example 7. The solid concentration of this latex was 0.20. Operations similar to those in Example 9 were made except that this latex was used in place of the latex of Example 9, the spraying pressure was changed from 0.20 MPa to 0.50 MPa, the temperature of hot air at the inlet was changed from 120° C. to 180° C., and the temperature of hot air at the outlet was changed from 72° C. to 130° C. Thereby, acrylic polymer powder (A-33) was obtained. Operations similar to those in Example 9 were made except that acrylic polymer powder (A-33) was used, respectively, in place of acrylic polymer powder (A-9) to prepare 2 kinds of acrylic sols. Various physical properties were measured or evaluated in similar ways as in Example 1.

Comparative Example 10

100 parts by mass of deionized water was mixed with 100 parts by mass of the latex containing acrylic polymer particles (II-5), obtained in Referential example 11. The solid concentration of this latex was 0.20. Operations similar to those in Example 12 were made except that this latex was used in place of the latex of Example 12, the spraying pressure was changed from 0.25 MPa to 0.50 MPa, the temperature of hot air at the inlet was changed from 140° C. to 200° C., the temperature of hot air at the outlet was changed from 85° C. to 74° C. and the feed amount of the latex was changed from 2.0 kg/hr to 1.5 kg/hr. Thereby, acrylic polymer powder (A-34) was obtained. Operations similar to those in Example 12 were made except that acrylic polymer powder (A-34) was used, respectively, in place of acrylic polymer powder (A-12) to prepare 2 kinds of acrylic sols. Various physical properties were measured or evaluated in similar ways as in Example 1.

Comparative Example 11

100 parts by mass of deionized water was mixed with 100 parts by mass of the latex containing acrylic polymer particles (II-6), obtained in Referential example 12. The solid concentration of this latex was 0.20. Operations similar to those in Example 13 were made except that this latex was used in place of the latex of Example 13, the spraying pressure was changed from 0.25 MPa to 0.50 MPa, the temperature of hot air at the inlet was changed from 140° C. to 200° C., the temperature of hot air at the outlet was changed from 85° C. to 74° C. and the feed amount of the latex was changed from 2.0 kg/hr to 1.5 kg/hr. Thereby, acrylic polymer powder (A-35) was obtained. Operations similar to those in Example 13 were made except that acrylic polymer powder (A-35) was used, respectively, in place of acrylic polymer powder (A-13) to prepare 2 kinds of acrylic sols. Various physical properties were measured or evaluated in similar ways as in Example 1.

Comparative Example 12

100 parts by mass of deionized water was mixed with 100 parts by mass of the latex containing acrylic polymer particles (I-5), obtained in Referential example 5. The solid concentration of this latex was 0.20. Operations similar to those in Example 14 were made except that this latex was used in place of the latex of Example 14, the spraying pressure was changed from 0.15 MPa to 0.10 MPa, the temperature of hot air at the inlet was changed from 100° C. to 180° C., the temperature of hot air at the outlet was changed from 50° C. to 82° C. and the feed amount of the latex was changed from 2 kg/hr to 1 kg/hr. Thereby, acrylic polymer powder (A-36) was obtained. Operations similar to those in Example 14 were made except that acrylic polymer powder (A-36) was used, respectively, in place of acrylic polymer powder (A-14) to prepare 2 kinds of acrylic sols. Various physical properties were measured or evaluated in similar ways as in Example 1.

Comparative Example 13

100 parts by mass of deionized water was mixed with 100 parts by mass of the latex containing acrylic polymer particles (II-7), obtained in Referential example 13. The solid concentration of this latex was 0.20. Operations similar to those in Example 20 were made except that this latex was used in place of the latex of Example 20, the spraying pressure was changed from 0.30 MPa to 0.50 MPa, the temperature of hot air at the inlet was changed from 140° C. to 200° C., the temperature of hot air at the outlet was changed from 80° C. to 74° C. and the feed amount of the latex was changed from 2.5 kg/hr to 1.5 kg/hr. Thereby, acrylic polymer powder (A-37) was obtained. Operations similar to those in Example 20 were made except that acrylic polymer powder (A-37) was used, respectively, in place of acrylic polymer powder (A-20) to prepare 2 kinds of acrylic sols. Various physical properties were measured or evaluated in similar ways as in Example 1.

The compositions and use amounts of the monomer mixtures on the acrylic polymer particles prepared in each Referential example, and the average particle size of the acrylic polymer particles are shown in Table 1. The kinds and use amounts of the acrylic polymer particles, surface tension-adjusting agent and water soluble macromolecule, and the kind of the reactive surfactant used in the preparation of the acrylic polymer powder in each example or comparative example are shown in Table 2. The surface tension of the latex, the latex condition and the spraying condition used in the preparation of the acrylic polymer powder in each example or comparative example, and the macropore diameter, micropore diameter and the ratio (A/B) of the pore volume A of macropores to the pore volume B of micropores on the acrylic polymer powder are shown in Table 3. The average particle size, the integral void volume on voids having a pore diameter of 1 μm or more, the percentage of void and the particle size ratio (a/b) of the length a to breadth b on the acrylic polymer powder prepared in each example or comparative example, and the kind of the acrylic polymer powder and the kind and use amount of the plasticizer used in the preparation of the acrylic sol in each example or comparative example are shown in Table 4. The particle destruction resistance, fluidity and storage stability of the acrylic sol used in each example or comparative example, and the bleed-out resistance, hardness, tensile strength, tensile elongation and foaming properties of the sheet formed from the acrylic sol are shown in Table 5.

TABLE 1

| | Acrylic polymer particles | Average particle size (μm) | First stage polymerization Monomer mixture Use amount (parts by mass) Composition (ratio by mass) | Second stage polymerization Monomer mixture Use amount (parts by mass) Composition (ratio by mass) | Third stage polymerization Monomer mixture Use amount (parts by mass) Composition (ratio by mass) | Fourth stage polymerization Monomer mixture Use amount (parts by mass) Composition (ratio by mass) |
|---|---|---|---|---|---|---|
| Ref. exam. 1 | (I-1) | 0.80 | MMA/iBMA 90(5/95) | MMA/iBMA/MAA/KH05 630(39/60/0.5/0.5) | MMA/iBMA/ MAA/KH05 360(58.5/40/0.5/1) | MMA/iBMA/MAA/ 2HEMA/KH05 720(64/30/2.5/2.5/1) |
| Ref. exam. 2 | (I-2) | 0.81 | MMA/iBMA 90(5/95) | MMA/iBMA/MAA/KH05 630(39/60/0.5/0.5) | MMA/iBMA/ MAA/KH05 360(43.5/55/0.5/1) | MMA/iBMA/MAA/ 2HEMA/KH05 720(48.5/45.5/2.5/2.5/1) |
| Ref. exam. 3 | (I-3) | 0.77 | MMA/iBMA 90(5/95) | MMA/iBMA/MAA/3NEX 630(39/60/0.5/0.5) | MMA/iBMA/ MAA/3NEX 360(58.5/40/0.5/1) | MMA/iBMA/MAA/ 2HEMA/3NEX 720(64/30/2.5/2.5/1) |
| Ref. exam. 4 | (I-4) | 0.77 | MMA/iBMA 90(5/95) | MMA/iBMA/MAA/KH05 630(39/60/0.5/0.5) | MMA/iBMA/ MAA/KH05 360(58.5/40/0.5/1) | MMA/iBMA/MAA/ 2HEMA/3NEX 720(64/30/2.5/2.5/1) |
| Ref. exam. 5 | (I-5) | 0.79 | MMA/iBMA 90(5/95) | MMA/iBMA/MAA/3NEX 630(39/60/0.5/0.5) | MMA/iBMA/ MAA/3NEX 360(43.5/55/0.5/1) | MMA/iBMA/MAA/ 2HEMA/3NEX 720(48.5/45.5/2.5/2.5/1) |
| Ref. exam. 6 | (I-6) | 0.79 | MMA/iBMA 90(5/95) | MMA/iBMA/MAA/3NEX 630(39/60/0.5/0.5) | MMA/iBMA/ MAA/3NEX 360(43.5/55/0.5/1) | MMA/iBMA/MAA/ 2HEMA/KH05 720(48.5/45.5/2.5/2.5/1) |
| Ref. exam. 7 | (II-1) | 0.67 | MMA/BA/PEG9G/ALMA 360(30/69.9/0.05/0.05) | MMA/iBMA/MAA/HS10 1440(93.5/5/1/0.5) | | |

TABLE 1-continued

| | Acrylic polymer particles | Average particle size (μm) | First stage polymerization Monomer mixture Use amount (parts by mass) Composition (ratio by mass) | Second stage polymerization Monomer mixture Use amount (parts by mass) Composition (ratio by mass) | Third stage polymerization Monomer mixture Use amount (parts by mass) Composition (ratio by mass) | Fourth stage polymerization Monomer mixture Use amount (parts by mass) Composition (ratio by mass) |
|---|---|---|---|---|---|---|
| Ref. exam. 8 | (II-2) | 0.42 | MMA/BA/PEG9G/ALMA 270(30/69.7/0.2/0.1) | MMA/CHMA/MAA/HS10 1530(92.5/5/2/0.5) | | |
| Ref. exam. 9 | (II-3) | 0.32 | MMA/BA/PEG9G 180(20/79.5/0.5) | MMA/HS10 1620(99.5/0.5) | | |
| Ref. exam. 10 | (II-4) | 0.20 | MMA/BA/PEG9G/ALMA 900(30/68.9/1/0.1) | MMA/BA/PEG9G/HS10 900(40/58.5/1/0.5) | | |
| Ref. exam. 11 | (II-5) | 0.68 | MMA/BA/PEG9G/ALMA 360(30/69.9/0.05/0.05) | MMA/iBMA/MAA/HS10 1440(45/53.5/1/0.5) | | |
| Ref. exam. 12 | (II-6) | 0.69 | MMA/BA/PEG9G/ALMA 360(30/69.9/0.05/0.05) | MMA/iBMA/MAA/130K 1440(93.5/5/1/0.5) | | |
| Ref. exam. 13 | (II-7) | 0.70 | MMA/BA/PEG9G/ALMA 360(30/69.9/0.05/0.05) | MMA/iBMA/MAA/130K 1440(45/53.5/1/0.5) | | |

Ref. exam.: Referential example

TABLE 2

| | Acrylic polymer particles in latex 100 parts by mass | Surface tension adjusting agent* (parts by mass) | | Water soluble macromolecule (parts by mass) | | Reactive surfactant |
|---|---|---|---|---|---|---|
| Exam. 1 | (I-1) | Na—DBS | 2 | Na—PAcA | 0.2 | KH05 |
| Exam. 2 | (I-1) | — | — | Na—PStS | 0.2 | KH05 |
| Exam. 3 | (I-1) | Na—AS | 1 | — | — | KH05 |
| Exam. 4 | (I-2) | CS141E | 3 | Na—PStS | 0.2 | KH05 |
| Exam. 5 | (I-3) | K—POEAEP | 1 | Na—PAcA | 0.5 | — |
| Exam. 6 | (I-4) | Na—DBS | 2 | Na—PStS | 1 | KH05 |
| Exam. 7 | (II-1) | CS141E | 2 | Na—PAcA | 0.2 | HS10 |
| Exam. 8 | (II-1) | — | — | Na—PAcA | 0.2 | HS10 |
| Exam. 9 | (II-1) | CS141E | 2 | — | — | HS10 |
| Exam. 10 | (II-1)/(II-2)/(II-3) = 6/2/2 | CS141E | 2 | Na—PAcA | 0.2 | HS10 in all |
| Exam. 11 | (I-1)/(II-4) = 7/3 | K—POEAEP | 2 | Na—PStS | 0.2 | KH05/HS10 |
| Exam. 12 | (II-5) | Na—AS | 2 | Na—PStS | 0.2 | HS10 |
| Exam. 13 | (II-6) | CS141E | 2 | Na—PAcA | 0.2 | — |
| Exam. 14 | (I-5) | — | — | — | — | — |
| Exam. 15 | (I-5) | Na—DBS | 2 | — | — | — |
| Exam. 16 | (I-5) | — | — | Na—PAcA | 0.2 | — |
| Exam. 17 | (I-3) | — | — | — | — | — |
| Exam. 18 | (I-2) | — | — | — | — | KH05 |
| Exam. 19 | (I-6) | — | — | — | — | KH05 |
| Exam. 20 | (II-7) | — | — | — | — | — |
| Exam. 21 | (II-7) | CS141E | 2 | — | — | — |
| Exam. 22 | (II-7) | — | — | Na—PStS | 0.2 | — |
| Exam. 23 | (II-6) | — | — | — | — | — |
| Exam. 24 | (II-5) | — | — | — | — | HS10 |
| C. exam. 1 | (I-1) | Na—DBS | 2 | Na—PAcA | 0.2 | KH05 |
| C. exam. 2 | (I-1) | — | — | Na—PStS | 0.2 | KH05 |
| C. exam. 3 | (I-1) | Na—AS | 1 | — | — | KH05 |
| C. exam. 4 | (I-2) | CS141E | 3 | Na—PStS | 0.2 | KH05 |
| C. exam. 5 | (I-3) | K—POEAEP | 1 | Na—PAcA | 0.5 | — |
| C. exam. 6 | (I-4) | Na—DBS | 2 | Na—PStS | 1 | KH05 |
| C. exam. 7 | (II-1) | CS141E | 2 | Na—PAcA | 0.2 | HS10 |
| C. exam. 8 | (II-1) | — | — | Na—PAcA | 0.2 | HS10 |
| C. exam. 9 | (II-1) | CS141E | 2 | — | — | HS10 |
| C. exam. 10 | (II-5) | Na—AS | 2 | Na—PStS | 0.2 | HS10 |
| C. exam. 11 | (II-6) | CS141E | 2 | Na—PAcA | 0.2 | — |
| C. exam. 12 | (I-5) | — | — | — | — | — |
| C. exam. 13 | (II-7) | — | — | — | — | — |

*as the effective component

[Abbreviations]
Na—DBS: Sodium dodecylbenzenesulfonate
Na—AS: Sodium alkylsulfonate (LATEMUL PS)

TABLE 2-continued

| | Acrylic polymer particles in latex 100 parts by mass | Surface tension adjusting agent* (parts by mass) | Water soluble macromolecule (parts by mass) | Reactive surfactant |
|---|---|---|---|---|

CS141E: Aromatic phosphate ester (ADEKA COL CS141E)
K—POEAEP: Potassium salt of polyoxyethylene alkyl ether phosphate (ELEC F)
Na—PAcA: Sodium polyacrylate
Na—PStS: Sodium polystyrenesulfonate
KH05: Ammonium salt of polyoxyethylene 1-(allyloxymethyl)alkyl ether sulfate ester
HS10: Ammonium salt of nonyl(propenyl)phenol ethylene oxide 10 mols-adduct sulfate ester
Exam.: Example
C.exam.: Comparative example

TABLE 3

| | Latex | | | | Acrylic polymer powder | | | | |
|---|---|---|---|---|---|---|---|---|---|
| | | | | | Macropore | | Micropore | | |
| | Surface tention µN/cm | Latex condition C | Spray drying condition D | C × D | Diameter (µm) | Pore volume A (mL/g) | Diameter (µm) | Pore volume B (mL/g) | A/B |
| Exam. 1 | 376 | 0.11 | 1.8 | 0.19 | 3.1 | 0.12 | 0.30 | 0.13 | 0.92 |
| Exam. 2 | 553 | 0.11 | 1.6 | 0.16 | 3.5 | 0.13 | 0.28 | 0.15 | 0.86 |
| Exam. 3 | 385 | 0.11 | 2.0 | 0.21 | 3.4 | 0.13 | 0.25 | 0.14 | 0.88 |
| Exam. 4 | 355 | 0.11 | 2.1 | 0.23 | 4.6 | 0.14 | 0.15 | 0.16 | 0.88 |
| Exam. 5 | 405 | 0.12 | 1.5 | 0.18 | 4.2 | 0.12 | 0.25 | 0.14 | 0.86 |
| Exam. 6 | 367 | 0.11 | 2.2 | 0.25 | 4.8 | 0.12 | 0.27 | 0.15 | 0.80 |
| Exam. 7 | 370 | 0.11 | 3.0 | 0.40 | 3.8 | 0.12 | 0.21 | 0.16 | 0.75 |
| Exam. 8 | 543 | 0.11 | 4.3 | 0.48 | 3.6 | 0.11 | 0.29 | 0.16 | 0.88 |
| Exam. 9 | 370 | 0.11 | 2.7 | 0.30 | 3.7 | 0.14 | 0.21 | 0.14 | 1.0 |
| Exam. 10 | 363 | 0.14 | 2.3 | 0.31 | 3.9 | 0.13 | 0.19 | 0.092 | 1.4 |
| Exam. 11 | 389 | 0.17 | 2.0 | 0.35 | 3.9 | 0.13 | 0.19 | 0.10 | 1.3 |
| Exam. 12 | 373 | 0.11 | 2.4 | 0.25 | 3.6 | 0.11 | 0.28 | 0.16 | 0.69 |
| Exam. 13 | 357 | 0.12 | 2.6 | 0.30 | 3.8 | 0.11 | 0.30 | 0.16 | 0.69 |
| Exam. 14 | 562 | 0.12 | 2.2 | 0.26 | 4.7 | 0.15 | 0.18 | 0.17 | 0.88 |
| Exam. 15 | 371 | 0.12 | 1.9 | 0.23 | 4.2 | 0.13 | 0.17 | 0.18 | 0.72 |
| Exam. 16 | 557 | 0.12 | 2.0 | 0.24 | 4.5 | 0.13 | 0.20 | 0.26 | 0.81 |
| Exam. 17 | 566 | 0.12 | 1.7 | 0.20 | 4.0 | 0.16 | 0.22 | 0.19 | 0.84 |
| Exam. 18 | 560 | 0.11 | 2.3 | 0.25 | 4.1 | 0.17 | 0.18 | 0.17 | 1.0 |
| Exam. 19 | 558 | 0.10 | 2.4 | 0.26 | 4.6 | 0.15 | 0.21 | 0.18 | 0.83 |
| Exam. 20 | 559 | 0.11 | 4.0 | 0.44 | 4.2 | 0.14 | 0.25 | 0.20 | 0.70 |
| Exam. 21 | 366 | 0.11 | 3.3 | 0.37 | 4.0 | 0.15 | 0.21 | 0.19 | 0.79 |
| Exam. 22 | 555 | 0.11 | 3.0 | 0.33 | 4.1 | 0.16 | 0.20 | 0.17 | 0.94 |
| Exam. 23 | 575 | 0.12 | 2.6 | 0.31 | 3.8 | 0.13 | 0.29 | 0.19 | 0.68 |
| Exam. 24 | 555 | 0.11 | 3.5 | 0.38 | 3.9 | 0.15 | 0.30 | 0.15 | 1.00 |
| C. exam. 1 | 376 | 0.053 | 8.1 | 0.43 | 5.3 | 0.18 | 0.56 | 0.21 | 0.86 |
| C. exam. 2 | 553 | 0.053 | 7.0 | 0.37 | 4.7 | 0.16 | 0.59 | 0.22 | 0.73 |
| C. exam. 3 | 385 | 0.053 | 9.8 | 0.65 | 5.6 | 0.16 | 0.60 | 0.20 | 0.80 |
| C. exam. 4 | 355 | 0.11 | 12.2 | 1.33 | 8.9 | 0.14 | 0.23 | 0.19 | 0.74 |
| C. exam. 5 | 405 | 0.12 | 14.6 | 1.81 | 9.2 | 0.13 | 0.31 | 0.18 | 0.72 |
| C. exam. 6 | 367 | 0.11 | 10.7 | 1.20 | 9.0 | 0.18 | 0.27 | 0.20 | 0.90 |
| C. exam. 7 | 370 | 0.057 | 15.8 | 0.89 | 10.8 | 0.13 | 0.57 | 0.25 | 0.52 |
| C. exam. 8 | 543 | 0.057 | 1.6 | 0.088 | 4.5 | 0.17 | 0.55 | 0.41 | 0.36 |
| C. exam. 9 | 370 | 0.057 | 1.7 | 0.094 | 3.1 | 0.18 | 0.54 | 0.43 | 0.35 |
| C. exam. 10 | 373 | 0.057 | 21.0 | 1.19 | 12.2 | 0.19 | 0.049 | 0.31 | 0.61 |
| C. exam. 11 | 357 | 0.057 | 14.0 | 0.79 | 10.0 | 0.17 | 0.048 | 0.21 | 0.81 |
| C. exam. 12 | 562 | 0.058 | 9.8 | 0.57 | 7.2 | 0.20 | 0.61 | 0.28 | 0.71 |
| C. exam. 13 | 559 | 0.057 | 21.0 | 1.20 | 12.1 | 0.18 | 0.59 | 0.32 | 0.56 |

TABLE 4

| | Acrylic sol | | | | | | | |
|---|---|---|---|---|---|---|---|---|
| | Acrylic polymer particles in latex | Acrylic polymer powder | Particle size*1 (µm) | Integral void volume*2 (mL/g) | Percentage of void (%) | Particle size ratio a/b | Plasticizer (parts by mass) | |
| | | | | | | | DINP | RDP |
| Exam. 1 | (I-1) | (A-1) | 30 | 0.75 | 58 | 1.2 | ○ | 100 |
| Exam. 2 | (I-1) | (A-2) | 34 | 0.78 | 60 | 2.1 | X | 100 |
| Exam. 3 | (I-1) | (A-3) | 27 | 0.77 | 59 | 1.2 | ○ | 100 |
| Exam. 4 | (I-2) | (A-4) | 24 | 0.73 | 58 | 1.1 | ○ | 100 |
| Exam. 5 | (I-3) | (A-5) | 28 | 0.79 | 57 | 1.5 | Δ | 100 |
| Exam. 6 | (I-4) | (A-6) | 26 | 0.77 | 62 | 1.2 | ○ | 100 |

TABLE 4-continued

| | | Acrylic sol | | | | | | | |
|---|---|---|---|---|---|---|---|---|---|
| | Acrylic polymer particles | Acrylic polymer | Particle size*1 | Integral void volume*2 | Percentage of void | Particle size ratio | | Plasticizer (parts by mass) | |
| | in latex | powder | (μm) | (mL/g) | (%) | a/b | | DINP | RDP |
| Exam. 7 | (II-1) | (A-7) | 20 | 0.72 | 63 | 1.2 | ○ | | 120 |
| Exam. 8 | (II-1) | (A-8) | 15 | 0.74 | 65 | 2.0 | X | | 120 |
| Exam. 9 | (II-1) | (A-9) | 18 | 0.71 | 60 | 1.2 | ○ | | 120 |
| Exam. 10 | (II-1)/(II-2)/(II-3) = 6/2/2 | (A-10) | 21 | 0.70 | 55 | 1.1 | ○ | | 120 |
| Exam. 11 | (I-1)/(II-4) = 7/3 | (A-11) | 32 | 0.71 | 56 | 1.1 | ○ | 100 | |
| Exam. 12 | (II-5) | (A-12) | 23 | 0.73 | 64 | 2.2 | X | | 120 |
| Exam. 13 | (II-6) | (A-13) | 21 | 0.75 | 62 | 1.3 | Δ | | 120 |
| Exam. 14 | (I-5) | (A-14) | 23 | 0.80 | 64 | 2.2 | X | 100 | |
| Exam. 15 | (I-5) | (A-15) | 27 | 0.76 | 62 | 1.2 | ○ | 100 | |
| Exam. 16 | (I-5) | (A-16) | 25 | 0.77 | 61 | 2.2 | X | 100 | |
| Exam. 17 | (I-3) | (A-17) | 24 | 0.81 | 59 | 2.1 | X | 100 | |
| Exam. 18 | (I-2) | (A-18) | 22 | 0.78 | 61 | 2.2 | X | 100 | |
| Exam. 19 | (I-6) | (A-19) | 21 | 0.82 | 63 | 2.1 | X | 100 | |
| Exam. 20 | (II-7) | (A-20) | 15 | 0.75 | 65 | 2.0 | X | | 120 |
| Exam. 21 | (II-7) | (A-21) | 18 | 0.72 | 64 | 1.2 | ○ | | 120 |
| Exam. 22 | (II-7) | (A-22) | 20 | 0.74 | 62 | 2.0 | X | | 120 |
| Exam. 23 | (II-6) | (A-23) | 19 | 0.79 | 67 | 2.1 | X | | 120 |
| Exam. 24 | (II-5) | (A-24) | 17 | 0.80 | 65 | 2.0 | X | | 120 |
| C. exam. 1 | (I-1) | (A-25) | 12 | 1.0 | 72 | 2.3 | X | 100 | |
| C. exam. 2 | (I-1) | (A-26) | 14 | 0.95 | 73 | 3.2 | X | 100 | |
| C. exam. 3 | (I-1) | (A-27) | 10 | 0.97 | 75 | 2.3 | X | 100 | |
| C. exam. 4 | (I-2) | (A-28) | 6 | 0.92 | 78 | 2.1 | X | 100 | |
| C. exam. 5 | (I-3) | (A-29) | 6 | 0.93 | 79 | 2.9 | X | 100 | |
| C. exam. 6 | (I-4) | (A-30) | 7 | 0.98 | 79 | 2.4 | X | 100 | |
| C. exam. 7 | (II-1) | (A-31) | 8 | 1.1 | 68 | 2.5 | X | | 120 |
| C. exam. 8 | (II-1) | (A-32) | 32 | 0.91 | 67 | 3.1 | X | | 120 |
| C. exam. 9 | (II-1) | (A-33) | 30 | 0.92 | 72 | 2.4 | X | | 120 |
| C. exam. 10 | (II-5) | (A-34) | 6 | 1.3 | 78 | 2.4 | X | | 120 |
| C. exam. 11 | (II-6) | (A-35) | 9 | 1.2 | 81 | 2.2 | X | | 120 |
| C. exam. 12 | (I-5) | (A-36) | 10 | 1.1 | 79 | 3.5 | X | 100 | |
| C. exam. 13 | (II-7) | (A-37) | 6 | 1.3 | 75 | 3.3 | X | | 120 |

*1 Average particle size
*2 Integral void volume on voids having a pore diameter of 1 μm or more

TABLE 5

| | Acrylic sol | | | | | | | | | | | | |
|---|---|---|---|---|---|---|---|---|---|---|---|---|---|
| | Particle destruction resistance | | | Fluidity | | | Storage stability | | | Sheet formed from acrylic sol | | | | |
| | V1 (mPa·s) | V2 (mPa·s) | V2/V1 | V1 (mPa·s) | V3 (mPa·s) | V3/V1 | V1 (mPa·s) | V4 (mPa·s) | V4/V1 | Bleed-out resistance | Hardness | Tensile strength (MPa) | Tensile elongation (%) | Foaming properties |
| Exam. 1 | 7500 | 7500 | ○ | 7500 | 7500 | ○ | 7500 | 7500 | ○ | ○ | 52 | 3.6 | 281 | ○ |
| Exam. 2 | 10000 | 11250 | ○ | 10000 | 25000 | Δ | 10000 | 11250 | ○ | ○ | 54 | 3.7 | 273 | ○ |
| Exam. 3 | 8750 | 20000 | Δ | 8750 | 9000 | ○ | 8750 | 8750 | ○ | ○ | 52 | 3.7 | 289 | ○ |
| Exam. 4 | 10000 | 11250 | ○ | 10000 | 11000 | ○ | 10000 | 22500 | Δ | ○ | 45 | 3.0 | 303 | ○ |
| Exam. 5 | 10000 | 11250 | ○ | 10000 | 12500 | ○ | 10000 | 25000 | Δ | ○ | 51 | 3.5 | 275 | Δ |
| Exam. 6 | 8750 | 8750 | ○ | 8750 | 10000 | ○ | 8750 | 18750 | Δ | ○ | 53 | 3.6 | 270 | ○ |
| Exam. 7 | 20000 | 20000 | ○ | 20000 | 21500 | ○ | 20000 | 20000 | ○ | ○ | 67 | 7.2 | 220 | ○ |
| Exam. 8 | 25000 | 25000 | ○ | 25000 | 52000 | Δ | 25000 | 27500 | ○ | ○ | 69 | 7.3 | 212 | ○ |
| Exam. 9 | 21250 | 45000 | Δ | 21250 | 23000 | ○ | 21250 | 22500 | ○ | ○ | 66 | 7.0 | 231 | ○ |
| Exam. 10 | 17500 | 17500 | ○ | 17500 | 19000 | ○ | 17500 | 17500 | ○ | ○ | 68 | 7.6 | 205 | ○ |
| Exam. 11 | 10000 | 10000 | ○ | 10000 | 14000 | ○ | 10000 | 12500 | ○ | ○ | 47 | 2.8 | 271 | ○ |
| Exam. 12 | 22500 | 25000 | ○ | 22500 | 28000 | ○ | 22500 | 51250 | Δ | ○ | 61 | 5.9 | 265 | ○ |
| Exam. 13 | 22500 | 25000 | ○ | 22500 | 25000 | ○ | 22500 | 46250 | Δ | ○ | 68 | 7.1 | 223 | Δ |
| Exam. 14 | 17500 | 40000 | Δ | 17500 | 57500 | Δ | 17500 | 45000 | Δ | ○ | 43 | 3.2 | 310 | Δ |
| Exam. 15 | 16250 | 37500 | Δ | 16250 | 25000 | ○ | 16250 | 40000 | Δ | ○ | 42 | 3.1 | 315 | Δ |
| Exam. 16 | 16250 | 17500 | ○ | 16250 | 42500 | Δ | 16250 | 42500 | Δ | ○ | 45 | 3.0 | 292 | Δ |
| Exam. 17 | 15000 | 32500 | Δ | 15000 | 37500 | Δ | 15000 | 35000 | Δ | ○ | 49 | 3.3 | 263 | Δ |
| Exam. 18 | 16250 | 35000 | Δ | 16250 | 40000 | Δ | 16250 | 30000 | ○ | ○ | 42 | 3.2 | 305 | ○ |
| Exam. 19 | 17500 | 38750 | Δ | 17500 | 55000 | Δ | 17500 | 40000 | Δ | ○ | 42 | 3.1 | 300 | Δ |
| Exam. 20 | 30000 | 80000 | Δ | 30000 | 91250 | Δ | 30000 | 77500 | Δ | ○ | 64 | 7.0 | 215 | Δ |
| Exam. 21 | 26250 | 70000 | Δ | 26250 | 45000 | ○ | 26250 | 65000 | Δ | ○ | 62 | 6.9 | 221 | Δ |
| Exam. 22 | 27500 | 35000 | ○ | 27500 | 80000 | Δ | 27500 | 70000 | Δ | ○ | 66 | 7.1 | 209 | Δ |
| Exam. 23 | 27500 | 75000 | Δ | 27500 | 85000 | Δ | 27500 | 75000 | Δ | ○ | 65 | 6.7 | 215 | Δ |

TABLE 5-continued

| | Acrylic sol | | | | | | | | | | | | | |
|---|---|---|---|---|---|---|---|---|---|---|---|---|---|---|
| | Particle destruction resistance | | | Fluidity | | | Storage stability | | | Sheet formed from acrylic sol | | | | |
| | V1 (mPa·s) | V2 (mPa·s) | V2/V1 | V1 (mPa·s) | V3 (mPa·s) | V3/V1 | V1 (mPa·s) | V4 (mPa·s) | V4/V1 | Bleed-out resistance | Hardness | Tensile strength (MPa) | Tensile elongation (%) | Foaming properties |
| Exam. 24 | 28750 | 78750 | Δ | 28750 | 90000 | Δ | 28750 | 52500 | ○ | ○ | 65 | 6.9 | 222 | ○ |
| C. exam. 1 | 11250 | 17500 | ○ | 11250 | 47000 | X | 11250 | 50000 | X | ○ | 51 | 3.5 | 278 | ○ |
| C. exam. 2 | 13750 | 20000 | ○ | 13750 | 89000 | X | 13750 | 75000 | X | ○ | 53 | 3.7 | 262 | ○ |
| C. exam. 3 | 12500 | 61250 | X | 12500 | 52000 | X | 12500 | 56250 | X | ○ | 52 | 3.5 | 273 | ○ |
| C. exam. 4 | 13750 | 22500 | ○ | 13750 | 67500 | X | 13750 | solidified | X | ○ | 44 | 2.9 | 296 | ○ |
| C. exam. 5 | 13750 | 21250 | ○ | 13750 | 62000 | X | 13750 | solidified | X | ○ | 51 | 3.4 | 270 | X |
| C. exam. 6 | 12500 | 20000 | ○ | 12500 | 53000 | X | 12500 | 51250 | X | ○ | 52 | 3.5 | 269 | ○ |
| C. exam. 7 | 30000 | 37500 | ○ | 30000 | 148000 | X | 30000 | 125000 | X | ○ | 68 | 7.0 | 215 | ○ |
| C. exam. 8 | 40000 | 52500 | ○ | 40000 | 222000 | X | 40000 | 187500 | X | ○ | 69 | 7.2 | 210 | ○ |
| C. exam. 9 | 37500 | 187500 | X | 37500 | 187000 | X | 37500 | 162500 | X | ○ | 67 | 7.3 | 218 | ○ |
| C. exam. 10 | 32500 | 42500 | ○ | 32500 | 156000 | X | 32500 | solidified | X | ○ | 60 | 5.8 | 260 | ○ |
| C. exam. 11 | 35000 | 46250 | ○ | 35000 | 146000 | X | 35000 | solidified | X | ○ | 68 | 7.0 | 212 | X |
| C. exam. 12 | 25000 | 80000 | X | 25000 | 120000 | X | 25000 | solidified | X | ○ | 42 | 3.0 | 300 | X |
| C. exam. 13 | 52000 | 205000 | X | 52000 | 260000 | X | 52000 | solidified | X | ○ | 63 | 6.8 | 210 | X |

In the above examples and comparative examples, Comparative examples 1 to 9 correspond to Examples 1 to 9, respectively, Comparative examples 10 to 12 correspond to Examples 12 to 14, respectively, and Comparative example 13 corresponds to Example 20. Each comparative example does not satisfy the condition that the integral void volume on voids having a pore diameter of 1 μm or more is 0.9 mL/g or less on the acrylic polymer powder, which is an indispensable condition of embodiment 1 (percentage of void) and satisfied in the corresponding example, and many of these comparative examples do not satisfy the condition that the percentage of void is 70% or less, either, which is another indispensable condition of embodiment 1 and satisfied in the corresponding examples (Table 4). As a result, in each of the examples, the fluidity and storage stability of the acrylic sol obtained are superior to those in the corresponding comparative example (Table 5).

Examples 14 to 16 are in such a correlation that Example 14 only satisfies the condition of embodiment 1 (percentage of void), Example 15 only satisfies the conditions of embodiment 1 and embodiment 2 (particle size ratio), and Example 16 only satisfies the conditions of embodiment 1 and embodiment 3 (water soluble macromolecule). In Example 15, the fluidity of the acrylic sol obtained is heightened, compared with Example 14, and in Example 16, the particle destruction resistance of the acrylic sol obtained is heightened, compared with Example 14 (Table 5). Similar tendency is seen also in Examples 20 to 22. Namely, Examples 20 to 22 are in such a correlation that Example 20 only satisfies the condition of embodiment 1 (percentage of void), Example 21 only satisfies the conditions of embodiment 1 and embodiment 2 (particle size ratio), and Example 22 only satisfies the conditions of embodiment 1 and embodiment 3 (water soluble macromolecule). In Example 21, the fluidity of the acrylic sol obtained is heightened, compared with Example 20, and in Example 22, the particle destruction resistance of the acrylic sol obtained is heightened, compared with Example 20 (Table 5). In Examples 1 to 4, 6 to 12, 18, 19 and 24 where a reactive surfactant (embodiment 4) was used, the foaming properties of the sheets obtained are superior to those in Examples 5, 13 to 17 and 20 to 23 where a reactive surfactant was not used (Table 5).

What is claimed is:

1. An acrylic polymer powder obtained by coagulating and drying a latex containing acrylic polymer particles, in which acrylic polymer powder, the average particle size of the powder is 5 to 100 μm, the percentage of void is 70% or less, and the integral void volume on voids having a pore diameter of 1 μm or more is 0.9 mL/g or less.

2. The acrylic polymer powder according to claim 1 wherein the acrylic polymer particles are acrylic polymer particles (I) which are multistage polymer particles obtained by forming latter stage polymer (I-b) in a latex containing former stage polymer (I-a), former stage polymer (I-a) being a copolymer containing 5% by mass or more but less than 50% by mass of a methyl methacrylate unit and formed by a polymerization reaction of one stage or polymerization reactions of succeeding two stages or more using mutually different monomer compositions, latter stage polymer (I-b) being a copolymer containing 50% by mass or more of a methyl methacrylate unit and formed by a polymerization reaction of one stage or polymerization reactions of succeeding two stages or more using mutually different monomer compositions, and the mass ratio of former stage polymer (I-a)/latter stage polymer (I-b) being 5/95 to 95/5.

3. The acrylic polymer powder according to claim 1 wherein the acrylic polymer particles are acrylic polymer particles (II) which are multistage polymer particles obtained by forming latter stage polymer (II-b) in a latex containing former stage polymer (II-a), former stage polymer (II-a) being a copolymer consisting of 50 to 99.99% by mass of an alkyl acrylate ester unit, 49.99% by mass or less of a unit of another monofunctional monomer copolymerizable with the alkyl acrylate ester and 0.01 to 10% by mass of a multifunctional monomer unit and formed by a polymerization reaction of one stage or polymerization reactions of succeeding two stages or more using mutually different monomer compositions, latter stage polymer (II-b) being a polymer containing 50% by mass or more of a methyl methacrylate unit and formed by a polymerization reaction of one stage or polymerization reactions of succeeding two stages or more using mutually different monomer compositions, and the mass ratio of former stage polymer (II-a)/latter stage polymer (II-b) being 5/95 to 95/5.

4. The acrylic polymer powder according to claim 2 wherein the macropore diameter of the acrylic polymer powder is 7 µm or less, and the micropore diameter thereof is 0.5 µm or less.

5. The acrylic polymer powder according to claim 3 wherein the macropore diameter of the acrylic polymer powder is 7 µm or less, and the micropore diameter thereof is 0.5 µm or less.

6. The acrylic polymer powder according to claim 2 wherein the ratio A/B of the pore volume A of macropores to the pore volume B of micropores per 1 g of the acrylic polymer powder is 0.5 to 5.

7. The acrylic polymer powder according to claim 3 wherein the ratio A/B of the pore volume A of macropores to the pore volume B of micropores per 1 g of the acrylic polymer powder is 0.5 to 5.

8. The acrylic polymer powder according to claim 4 wherein the ratio A/B of the pore volume A of macropores to the pore volume B of micropores per 1 g of the acrylic polymer powder is 0.5 to 5.

9. The acrylic polymer powder according to claim 5 wherein the ratio A/B of the pore volume A of macropores to the pore volume B of micropores per 1 g of the acrylic polymer powder is 0.5 to 5.

10. The acrylic polymer powder according to claim 2 wherein the coagulation and drying is spray drying.

11. The acrylic polymer powder according to claim 3 wherein the coagulation and drying is spray drying.

12. The acrylic polymer powder according to any one of claims 1 to 11 wherein the particle size ratio a/b of the length a to breadth b of the acrylic polymer powder observed through an electron microscope is 1.0 or more but less than 2.

13. The acrylic polymer powder according to claim 12 wherein the surface tension of the latex containing the acrylic polymer particles is 500 µN/cm or less.

14. The acrylic polymer powder according to any one of claims 1 to 11 wherein the latex is a latex containing the acrylic polymer particle and a water soluble macromolecule having a weight average molecular weight of 10,000 or more, and the use amount of the water soluble macromolecule is 0.001 to 10 parts by mass based on 100 parts by mass of the acrylic polymer particles, and the acrylic polymer powder is obtained by spray drying the latex.

15. The acrylic polymer powder according to any one of claims 2 to 11 wherein the acrylic polymer particles (I) are multistage polymer particles which are obtained by forming latter stage polymer (I-b) in a latex containing former stage polymer (I-a), and have at least one layer consisting of a copolymer having a reactive surfactant as a constituent.

16. The acrylic polymer powder according to claim 15 which has the layer(s) consisting of a copolymer having a reactive surfactant as a constituent, at least as the outermost layer.

17. The acrylic polymer powder according to claim 1 wherein the latex is a latex obtained by mixing a latex containing acrylic polymer particles (II-a), which are particles of a copolymer (II-a) consisting of 50 to 99.99% by mass of an alkyl acrylate ester unit, 49.99% by mass or less of a unit of another monofunctional monomer copolymerizable with the alkyl acrylate ester and 0.01 to 10% by mass of a multifunctional monomer unit and formed by a polymerization reaction of one stage or polymerization reactions of succeeding two stages or more using mutually different monomer compositions, with a latex containing acrylic polymer particles (I-1) which are multistage polymer particles obtained by forming latter stage polymer (I-b) in a latex containing former stage polymer (I-1-a), former stage polymer (I-1-a) being a copolymer containing 20% by mass or more but less than 50% by mass of a methyl methacrylate unit at least in the outermost layer thereof and formed by a polymerization reaction of one stage or polymerization reactions of succeeding two stages or more using mutually different monomer compositions, latter stage polymer (I-b) being a polymer containing 50% by mass or more of a methyl methacrylate unit and formed by a polymerization reaction of one stage or polymerization reactions of succeeding two stages or more using mutually different monomer compositions, and the mass ratio of former stage polymer (I-1-a)/latter stage polymer (I-b) being 5/95 to 95/5, at an acrylic polymer particles (II-a)/acrylic polymer particles (I-1) ratio by mass of 5/95 to 40/60.

18. An acrylic sol comprising the acrylic polymer powder according to any one of claims 1 to 11 and a plasticizer.

19. An acrylic sol comprising the acrylic polymer powder according to claim 12 and a plasticizer.

20. An acrylic sol comprising the acrylic polymer powder according to claim 14 and a plasticizer.

21. An acrylic sol comprising the acrylic polymer powder according to claim 15 and a plasticizer.

22. An acrylic sol comprising the acrylic polymer powder according to claim 17 and a plasticizer.

23. A molding obtained from the acrylic sol according to claim 18.

24. A molding obtained from the acrylic sol according to claim 19.

25. A molding obtained from the acrylic sol according to claim 20.

26. A molding obtained from the acrylic sol according to claim 21.

27. A molding obtained from the acrylic sol according to claim 22.

* * * * *